United States Patent
Sorensen et al.

(10) Patent No.: US 11,765,216 B2
(45) Date of Patent: Sep. 19, 2023

(54) AUTHENTICATING-AND-PROFILING SYSTEM AND METHOD FOR DELIVERING REQUESTED CONTENT

(71) Applicant: INCLUSIVE TECHNOLOGY SOLUTIONS, LLC, Boise, ID (US)

(72) Inventors: Andrea J. Hansen Sorensen, Boise, ID (US); Ben Whitaker, Meridian, ID (US); John Waite, Meridian, ID (US); Adam Thomas, Meridian, ID (US); Nora Kitchen, Boise, ID (US); Dallas James, Kuna, ID (US)

(73) Assignee: INCLUSIVE TECHNOLOGY SOLUTIONS, LLC, Boise, ID (US)

( * ) Notice: Subject to any disclaimer, the term of this patent is extended or adjusted under 35 U.S.C. 154(b) by 0 days.

(21) Appl. No.: 17/678,890

(22) Filed: Feb. 23, 2022

(65) Prior Publication Data
US 2022/0247805 A1 Aug. 4, 2022

Related U.S. Application Data

(62) Division of application No. 16/803,331, filed on Feb. 27, 2020, now Pat. No. 11,265,354, which is a
(Continued)

(51) Int. Cl.
*G06F 15/16* (2006.01)
*H04L 65/612* (2022.01)
(Continued)

(52) U.S. Cl.
CPC ........ *H04L 65/612* (2022.05); *G06F 16/9566* (2019.01); *G06F 21/33* (2013.01);
(Continued)

(58) Field of Classification Search
CPC ....... H04L 65/612; H04L 67/53; H04L 63/08; H04L 63/101; H04L 63/102; H04L 67/06;
(Continued)

(56) References Cited

U.S. PATENT DOCUMENTS 5,223,844 A 6/1993 Mansell et al.
5,471,392 A 11/1995 Yamashita
(Continued)

*Primary Examiner* — Moustafa M Meky
(74) *Attorney, Agent, or Firm* — Chang & Hale LLP

(57) ABSTRACT

A server operates between a patron (user), a subscriber (e.g., owner of a venue of exhibits and its website; museum, stadium, zoo, theme park, etc.), and possibly third parties such as a content distribution network (CDN). Access and content delivery are based on 1) control information provided to a patron device by physical objects at the venue and sent by the patron device to the server as part of a mutual authentication to one another, 2) user-specific information corresponding to the patron device, and 3) a pre-authorization exchange granting user-device access to physical objects and the server with the server receiving access to the user-specific information in order to locate requested information and select a subset thereof adapted in accordance with the user information. Moving physically between exhibits, a patron device rapidly disengages and re-engages the server, based thereon, without repeated logins.

20 Claims, 13 Drawing Sheets

Related U.S. Application Data division of application No. 16/038,380, filed on Jul. 18, 2018, now Pat. No. 10,587,662.

(60) Provisional application No. 62/653,393, filed on Apr. 5, 2018, provisional application No. 62/618,803, filed on Jan. 18, 2018, provisional application No. 62/559,811, filed on Sep. 18, 2017.

(51) Int. Cl.

| | | |
|---|---|---|
| *G06F 21/44* | (2013.01) | |
| *G06F 21/60* | (2013.01) | |
| *G06F 21/62* | (2013.01) | |
| *H04L 9/40* | (2022.01) | |
| *G06F 16/955* | (2019.01) | |
| *G06F 21/33* | (2013.01) | |
| *H04L 67/06* | (2022.01) | |
| *H04L 67/52* | (2022.01) | |
| *H04L 67/53* | (2022.01) | |

(52) U.S. Cl.
CPC .......... *G06F 21/445* (2013.01); *G06F 21/604* (2013.01); *G06F 21/62* (2013.01); *H04L 63/08* (2013.01); *H04L 63/101* (2013.01); *H04L 63/102* (2013.01); *H04L 67/06* (2013.01); *H04L 67/52* (2022.05); *H04L 67/53* (2022.05); *G06F 2221/2141* (2013.01); *H04L 63/107* (2013.01)

(58) Field of Classification Search
CPC ... H04L 63/107; G06F 16/9566; G06F 21/33; G06F 21/445; G06F 21/604; G06F 21/62
USPC .......................................................... 709/219
See application file for complete search history.

(56) References Cited

U.S. PATENT DOCUMENTS

| | | |
|---|---|---|
| 5,485,163 A | 1/1996 | Singer et al. |
| 5,524,081 A | 6/1996 | Paul |
| 5,552,989 A | 9/1996 | Bertrand |
| 5,652,570 A | 7/1997 | Lepkofker |
| 5,767,795 A | 6/1998 | Schaphorst |
| 5,864,125 A | 1/1999 | Szabo |
| 5,880,958 A | 3/1999 | Helms et al. |
| 5,948,040 A | 9/1999 | DeLorme et al. |
| 6,085,148 A | 7/2000 | Jamison et al. |
| 6,401,032 B1 | 6/2002 | Jamison et al. |
| 7,996,538 B2 | 8/2011 | Kikkawa et al. |
| 8,090,863 B2* | 1/2012 | Raciborski ............ G06F 16/182 709/231 |
| 8,255,557 B2 | 8/2012 | Raciborski et al. |
| 8,301,765 B2* | 10/2012 | Goodman .............. G06Q 10/06 709/224 |
| 8,463,876 B2* | 6/2013 | Raciborski ............ H04L 67/60 709/219 |
| 9,015,275 B2* | 4/2015 | Raciborski ............ H04L 67/10 709/217 |
| 9,185,137 B2* | 11/2015 | Amemiya ........ H04N 21/41415 |
| 9,286,397 B1* | 3/2016 | Suleman ............... G06F 16/951 |
| 9,400,877 B2 | 7/2016 | Isozaki et al. |
| 9,749,859 B2 | 8/2017 | Jung et al. |
| 9,774,922 B2* | 9/2017 | Wong ................. H04N 21/6587 |
| 9,788,166 B2 | 10/2017 | Li et al. |
| 9,838,839 B2 | 12/2017 | Vudali et al. |
| 9,990,439 B2* | 6/2018 | Sharma ................... H04L 67/02 |
| 10,148,791 B2 | 12/2018 | Hines |
| 10,192,240 B1 | 1/2019 | Jacobs et al. |
| 10,587,662 B2 | 3/2020 | Sorensen et al. |
| 10,762,514 B1* | 9/2020 | O'Toole ............ G06Q 30/0201 |
| 11,265,354 B2* | 3/2022 | Sorensen ............... H04L 67/52 |
| 11,611,804 B2* | 3/2023 | Loheide ................ H04N 21/262 |
| 2006/0195545 A1 | 8/2006 | Kikkawa et al. |
| 2007/0074079 A1 | 3/2007 | Forster et al. |
| 2010/0110893 A1* | 5/2010 | Lee ......................... H04L 67/53 370/241 |
| 2011/0252100 A1* | 10/2011 | Raciborski ............ G06F 16/182 709/217 |
| 2012/0297033 A1* | 11/2012 | Raciborski ............ H04L 67/06 709/219 |
| 2013/0194431 A1 | 8/2013 | O'Connor et al. |
| 2013/0198044 A1 | 8/2013 | O'Connor et al. |
| 2014/0039916 A1* | 2/2014 | Barden .................. G16H 10/20 705/2 |
| 2014/0040437 A1 | 2/2014 | Mitsuya et al. |
| 2014/0101781 A1 | 4/2014 | Bouknight |
| 2015/0088847 A1* | 3/2015 | Nelson ................ G06F 16/9535 707/706 |
| 2015/0143473 A1 | 5/2015 | Jung et al. |
| 2017/0323082 A1* | 11/2017 | Barden .................. G16H 10/20 |
| 2018/0114249 A1 | 4/2018 | Malkin et al. |
| 2018/0225687 A1 | 8/2018 | Ahmed et al. |
| 2019/0007725 A1 | 1/2019 | Ferrer |
| 2019/0238622 A1* | 8/2019 | Doumet ................ G06F 3/0482 |
| 2021/0075881 A1* | 3/2021 | Radhakrishnan ....... H04L 67/63 |
| 2021/0321162 A1* | 10/2021 | Loheide .............. H04N 21/2668 |
| 2022/0070249 A1* | 3/2022 | Doumet .................... G06F 8/70 |
| 2022/0223236 A1* | 7/2022 | Barden .................. G16H 10/20 |

\* cited by examiner

AUTHENTICATING-AND-PROFILING SYSTEM AND METHOD FOR DELIVERING REQUESTED CONTENT

RELATED APPLICATIONS

This application is a divisional (continuation) application of U.S. patent application Ser. No. 16/803,331, filed on Feb. 27, 2020, schedule to issue on Mar. 1, 2022 as U.S. Pat. No. 11,265,354, which is a divisional (continuation) application of U.S. Pat. No. 10,587,662, issued on Mar. 10, 2020, which claims the benefit of U.S. Provisional Patent Application Ser. No. 62/559,811, filed on Sep. 18, 2017, U.S. Provisional Patent Application Ser. No. 62/618,803, filed on Jan. 18, 2018, and U.S. Provisional Patent Application Ser. No. 62/653,393, filed Apr. 5, 2018, all of which references are hereby incorporated by reference in their entirety.

BACKGROUND

1. Field of the Invention

This invention relates to user interfaces for delivery of website content and, more particularly, to novel systems and methods for simplifying authentication of users with their access rights and preferences, and selection and delivery of content, in different formats, selections, authorizations, or languages according to user information.

2. Background Art

Websites abound. Since the creation of the Internet decades ago by the Defense Advanced Research Projects Administration (DARPA), the Internet has grown to become very cosmopolitan and international. With this widespread applicability and access, websites may be accessed from multiple nations. This creates various obstacles or problems to be solved, such as authentication. Typically this is done by login scripts, associated webpages presenting dialog boxes or fields to be filled in by a user with a username, password, and possibly some account information to verify the identity of the user. Permissions, authorizations, access to various content, administrative access for reading or writing to locations on a website, and the like may be controlled by various mechanisms.

Websites that are primarily available to consumers (e.g., individual users) with consumer services or benefits are problematic. For example, a museum, national park, zoo, or other website may have visitors (browsers). Likewise, these entities have physical venues, which may be visited by patrons of any nationality language, ethnicity, age, capacity, or maturity. Similarly, business websites may provide information at differing levels of detail and authorization to customers, sales staff, managers, executives, owners associated therewith. It would be beneficial to provide tailored content more simply, on the fly, so to speak, without laborious log-ins, especially when location and content change within minutes, and such overhead for access becomes so very burdensome.

This may apply to information accessed over the Internet to website visitors, but also to visitors (staff, patrons, etc.) actually onsite at a venue. Content may include images, text, descriptions, audio playback. These may pertain to or augment exhibits, maps, instructions, responses to questions, data, charts, reports, and so forth.

Conventional controls and logins for access and authentication are comparatively clumsy, especially when considering an individual passing between many different exhibits mere minutes apart at a physical site (venue). Moreover, providing tailored content onsite or offsite is problematic.

One conventional solution is to simply create multiple websites, each written to a different audience. That audience may be distinguished by language, culture, relationship, status, authority, role, responsibility, vetting, or the like.

For example, the Hewlett Packard Corporation website (www.hp.com) is one example. The LDS church (www.lds.org) website provides an example. They demonstrate conventional creation of effectively multiple websites, each dedicated to its own language. Each makes sense. Each serves a huge, worldwide population every day.

Not so, custom content delivered to an individual visiting a venue containing many exhibits. Some exhibits may be skipped. Time at each and the order of visiting may be somewhat, or even completely, arbitrary. It would be an advance in the art to provide a better, less clumsy, and more transparent authentication process early, thereby replacing a later authentication.

Thus, later authentication may be opaque and non-invasive, even automatic. An individual need not log in and out repeatedly during a short time span, such as passing between exhibits at a museum, historical site, or other venue. Both simplification of authentication and providing language differentiation in content delivery without requiring an entirely different website to do so would improve the ability of comparatively smaller organizations and venues to make use of authentication systems and multi-lingual content.

BRIEF SUMMARY OF THE INVENTION

In view of the foregoing, in accordance with the invention as embodied and broadly described herein, a method and apparatus are disclosed in one embodiment of the present invention as including a Liiingo™ server connected over an internetwork, such as the Internet. A Liiingo™ server operates between a patron and a subscriber, such as an owner, manager, or other agency responsible for a venue and its website. Typically, a venue is a place represented by a website, both visited by patrons. A patron may be thought of as an individual user, a commercial patron of a venue such as a museum, stadium, zoo, theme park, or other entertainment event that may have different stations, exhibits, or the like in reasonably close proximity (in a single venue).

The Liiingo™ server is recruited in the service of a subscriber (venue owner) and is accessed by a patron or individual user. The Liiingo™ server maintains account information, which may include information regarding all subscribers as well as all patrons. The server controls access and content delivery. It may also collect demographic data, use, content tracking, and the like regarding subscribers, patrons, or both. This information may be useful to subscribers, and historically useful for patrons, in order to prepare, select, and deliver probable content desired.

Meanwhile, video content or other content, particularly that which requires considerable storage and bandwidth for maintenance and delivery may be streamed from a remote, third-party website engaged by the Liiingo™ server for the purpose. In certain embodiments, the patron or individual user may access content related to an individual subscriber through the Liiingo™ subscriber online from a desktop computer, or online from a mobile device, such as a smartphone, tablet, kiosk, or other network-aware, computerized device.

The Liiingo™ server may embody and implement programming for rapid authentication by novel and nonobvious methods compared to prior art systems in order to render more transparent and seamless the motion of a patron between site content of a desktop computer, and particularly when moving physically between exhibits at a recreational or other venue. Various third party servers may contain media files and streaming software to deliver video content and other content in a selected language corresponding to an individual patron.

In certain embodiments, a system in accordance with the invention may be thought of as being accessed by various entities. For example, a patron using a mobile device, and onsite at a recreational venue, may be thought of as a viewer of content. Meanwhile, certain systems remotely carried by patrons may instead rely on a widget viewer in accordance with the invention.

A subscriber may access a server through a conventional browser on a desktop computer, while an administrator of a website for a subscriber may have access over the Internet through a browser as well. Meanwhile, a super administrator may be designated for highest level or broadest availability of permissions in order to manage both subscriber issues and content issues. In fact, a super administrator or an administrator may be an employee of a subscriber organization.

However, it is typically preferable that a super administrator be associated with the Liiingo™ server itself, while an administrator may be either an employee of the Liiingo™ system or of a subscriber with limited permissions to work over administrative data and content upgrades.

In certain embodiments, a Liiingo™ server in accordance with the invention may listen for requests, and receive an API request through an API program for the purpose. Authentication may involve checking tokens, verifying validity, checking credentials, and creating tokens for property authenticated access not originally possessing them. Permissions may be checked against various criteria including payment, geographic fencing, relationships, pre-authorized roles, need to know, and so forth.

The process may include a validation portion or authentication portion, which, when properly completed, will then process a request by reading, routing to a controller, and executing the processes required to comply with a request or to respond to the request. These may include the typical processes of creating, reading, updating, or deleting data. Limitations on the processing may be limited to particular areas, exhibits, locations, content, language preferences, and the like.

Ultimately, after authentication and processing, a system in accordance with the invention may respond by providing status information, actual data including rendered data in video, audio, visual image, text, or the like. Likewise, a response may include a message of instruction, or a content message.

One currently contemplated embodiment of a possible interaction system operates between a subscriber and a server in accordance with the invention. It may also include another administrator acting on behalf of a subscriber. An administrative agent may launch a browser, input or receive a uniform resource locator (URL) and then access a server in accordance with the invention.

The server may then server a client side web application in a language such as HTML, CSS, JavaScript, or the like. At this point, a user computer may load a web application onto the patron's computerized device, such as a mobile platform.

Requests may be made to the application programming interface (API) on the Liiingo™ server including retrievals, saving, creating, reading, updating, deleting, and so forth. The Liiingo™ server may then process the request and respond to it. At that point, action by the application executing on the patron device may then occur. This process may continue until an authorization expires, a patron desires to logoff, shutoff, or move away from an authorized and applicable location. The user interaction may include purchasing an application (App) at an application store, installing it, and thereby having access to API requests or making an API request of the system.

In other modes, an individual may attempt to access a website, and be detected as not containing a proper application (App), and thereby being offered information of how to access the application. To this end, something such as a bar scan, or QR scan may result in reading a particular URL, launching a browser to access that website identified with the URL, and then testing for presence of an application.

If the application is present then API requests may be submitted. If not, then the patron may be redirected again to a web application store to access the store, purchase, or agree to provisions required, followed by downloading the application and installing it.

A process may pass through submitting an API request, processing that request and the authentication for it by the Liiingo™ server, followed by responding to that request which will usually involve sending a content identifier and then submitting content views controlled by the content identifier. The user may then download the content to be viewed, and repeat that process with additional API request. API request may occur by selecting of buttons reflecting decisions and desires of a patron, or may be automatic with the movement of a patron from exhibit to exhibit. Ultimately, upon completing a tour of various exhibits, a user may be logged out affirmatively, or automatically in accordance with various embodiments of the invention.

In one embodiment of an apparatus and system in accordance with the invention, a method may be used to customize a software application for a user experience by mutual authorization. For example, an exchange may occur between a main server and a patron device. A patron device is typically a network aware device, such as a smart phone, a tablet, or the like. Meanwhile, a server may be available through a wide area network (e.g., WiFi) in order to access the internet. The device will typically be hand held, although certain desktop access to a website supported by a main server is also contemplated.

Pre-authorization is provided from the patron device to the main server. This is typically done by accessing a webpage through a browser on the patron device in order to request access to the main server hosting that webpage, by granting certain permissions. For example, the main server may download selected information to the patron device and loaded application (App) thereon. The App is dedicated to contacting the main server directly by a simplified login process. In one contemplated embodiment, a user may download the App from the main server to the patron device and install it. In the process a user provides certain pre-authorization for subsequent communications of proprietary information of each (both the main server and the patron device. This authorization may include authorizing communications and sharing of data between some other entity (surrogate) associated with the main server and the patron device associated with a patron device in the future.

Consent may be exchanged for access to the main server by a login procedure, a terms-of-use contract, or the like.

Meanwhile, permission may be granted to access certain information from the patron device or certain information regarding the patron who owns or controls the patron devices or the information on the patron device. Permission may include authorization for access, use, or both in a future time. These may all be pre-authorized by a user (patron) through the patron device.

It is explained and understood between the main server and the patron device that future communications therebetween may be triggered by a physical object. The physical object provides an ability to customize and authorize certain exchanges based on proximity to, or information provided by, the physical object.

In certain embodiments, the main server may actually be the physical instantiation of a website serving information that pertains to or explains more about the physical object itself or an associated exhibit. For example, the main server may be owned by a museum, theme park, zoo, botanical garden, canopy tour, bicycle pathway, city park, or operator of another venue. Thus, an individual pre-authorizes communication with the main server.

One benefit is the exchanging between the main server and the patron device of a request for certain content, which may be identified as "requested content." Typically, the physical object may provide certain information, including an identifier. The identifier is uniquely associated with the physical object. Thus, if an exhibit is nearby, or is the physical object, then the identifier may be scanned in by any suitable method, received from a beacon at the exhibit communicating to the patron device, or the like. The patron device may thus read or otherwise communicate from the physical object certain information, including an identifier uniquely associated with the physical object, as well as data unique to and identifying content on a webpage of the main server. Identifiers may be uniquely associated with the physical object, its immediate location, an exhibit associated therewith and identified thereby, for the web content available in associates therewith, or the like.

In this way, certain security mechanisms may be automated in subsequent use without requiring another login, any password, or other authorization to the main server from the patron device. For example, the patron device hosts an application previously provided by the main server. During the receipt of that App, the main server, the patron device, each, either, or both, will have transmitted (e.g., exchanged) certain information that effectively renders the patron device an approved client of the main server and authorized to have certain access rights. The App, when executing on the patron device may contact the main server, and identify authorized information from the patron device, providing any security codes or code numbers, client number, or the like required and recognized by the main server in order to operate with the patron device. Information provided by the patron device will provide identification of the patron device, and may provide certain settings or other information particular to the patron device.

For example, the patron device may contact the main server, by browsing to a webpage directly. The patron device will typically browse to that webpage or a homepage associated with the main server immediately and directly upon launching the App on the patron device.

In one example, the patron device may be turned on, and the application thereon may be launched upon entry to a venue. Thereafter, an exhibit may be encountered, having a physical object positioned proximate thereto. For example, a frame, a kiosk, a post, a sign, or the like may present at the venue, and be scanned by a reading device or a reading application an associated hardware in the patron device. This identifies the fact that the patron device is at the physical object and able to access data authorized thereby. Thus, the patron device may read certain information from the physical object, or receive it by transmission from the physical object.

Having received information, including an identifier, the application may then communicate with the main server what information is wanted, identified by the identifier provided by the physical object. Linking occurs to the requested content. The main server may thereby bring up from a database or other location, the requested information (content).

Typically, that information may be served by the main server, drawn from a database and served by a webpage hosted by the main server. Alternatively, the content may be forwarded to the browser or application running on the patron device from some other (third party) server. For example, very large files, such as audio files and video file are best served by a content distribution network (CDN).

Meanwhile, maintaining a linking of the requested content to the main server with respect to either a database, a content server (CDN), or the server itself may render possible the serving of the requested content to the patron device.

Authenticating the patron device to the main server may be accomplished by the App hosted thereon. It may send certain information, such as a customer or client identification number assigned to the App. It may submit other key information, but typically not requiring a user to intervene, provide a user name, password, or the like. One benefit of a system and method in accordance with the invention is that a user (patron) need not log in repeatedly to a website or different ones as a tour throughout a venue proceeds from location to location. By maintaining the linking of the requested content to the main server and to a location where that requested content may be found, the main server remains in control of what information is provided.

The information may be updated at will. A subscriber entity (the venue owner), such as the zoo, museum, or other business entity responsible for the venue, may be in control, while not having to host and maintain all of the files. Meanwhile, the patron device may be authenticated to the main server by the identifying information that the application uses to contact the main server.

In fact, with the App installed in the patron device, the patron device may effectively "call home" through the App. The App will be able to contact and continually update the contact information to the main server. Meanwhile, the patron device may then provide access to patron data needed to customize (e.g., for format, detail, language, age appropriateness) the content delivered to the patron device according to the patron experience desired or needed.

For example, a user may need language help. That language help may involve a foreign language with respect to the location of the venue, may include American Sign Language (ASL) providing signing, text, or the like. For example, subtitles may be provided since audio cannot be received by the patron, or an ASL interpreter, or simply hand signs, may be shown on a screen delivering a video or audio presentation.

In one embodiment, basic information, since it is time specific, physical location specific, physical object specific, patron device specific, or pre-set-arrangement specific, or several thereof, may be provided to the patron device exactly as desired. Again, the information presented in a foreign language with respect to the venue, may be provided in a video format for a person who is sighted, may be provided in only audio format, or audio-video format, or the like, as best suits, and therefore is authorized for receipt by, the patron device.

In certain embodiments, such a method may include displaying by the patron device images, text, audio, video, a combination thereof, or the like. An individual patron may receive on the patron device controlled thereby the specific format that can best be understood by the patron. Meanwhile, the main server may authorize a content distribution network (CDN) server to deliver the requested content to the patron device. Typically, audio files, video files, and the like are comparatively quite large compared to text, characters, diagrams, and even "stills" (images). Thus, they are best served by a CDN server adapted to that specific use.

In one embodiment, part of the information provided by the fixed object communicating to the patron device may be a uniform resource locator (URL) identifying certain specific information to be served to the patron device. Meanwhile, communication of the information from the patron device, or identifying the patron device, may directly identify within that URL, a subset of the information (content) available that will ultimately be provided.

Thus, information may be provided in multiple languages, multiple formats, or both. The specific one of those presentations identified to coordinate with the specific patron device, is served up. All that coordination is based on the patron device knowing the proper URL, the main server knowing the patron device, and the exchanges authorized and tailored based thereon.

Knowing the proper URL is itself only possible by reading the information from the physical object. This assures that the patron device is at the physical object. Meanwhile, that information may also be identified by a corresponding data table, binding table, or the like to the main server. Information is only authorized to go to a designated server. Thus it cannot be purloined by any other system. Unless an individual patron device is accessing the specific URL through the patron device, the information will not be sent to any machine but the main server for presentation to the App on the patron device. The same applies to the CDN, or the like.

Actual knowledge at the specific time and linking access to the server are all required in order to access information. Thus, time, access to the physical object, physical patron device, and identification information on the patron device, specifically, are used individually and together to provide mutual authorization between the patron device and the main server. Meanwhile, that same identification information may be relied upon by the main server in instructing the CDN (as a surrogate server) to serve to the patron device the requested content.

In various embodiments, the physical object may be a fixture installed at a location at a venue. For example, the fixture may simply be a sign, post, label, or the like located on a particular piece of real estate or at a particular location on a path, road, exhibit, or the like. This fixture corresponds uniquely to a proximity to a physical location. The physical object may actually be a sign. On the other hand, it may also be a beacon, or kiosk, or simply a readable code fixed to some sign, such as on a building or sign post.

Other embodiments may include books or other reading material having a readable code, string of characters, QR code, bar code, or the like. One advantage of the QR codes is the fact that they provide a two dimensional array of data bits in a black and white format that will permit substantial information transfer.

The physical object may also be a vehicle. A package containing a product may be labeled with certain information or codes, or that information may be contained on some object (instruction, product) inside the package. Meanwhile, signs and transmitters may also provide information of codes to the patron device.

In certain embodiments of an apparatus and method in accordance with the invention a patron device may provide location data identifying its specific location to the main server. However, by virtue of obtaining certain code information or any information from the physical location to the patron device, the patron device may thereby identify to the main server its own location.

The main server may authorize delivery of the requested content based on a comparison of the location data and the content location data (the corresponding location to which the request content pertains) in some database record or index. The main server corresponding to the subscriber owning or controlling the venue of which the physical object exists may then serve up the requested content. Again, the requested content may be served up from the main server, may be retrieved from a database that is served up by the server, or may be served up by a third party CDN at the request and authorization of the main server.

Such a method may also include providing a system that includes the main server, a CDN, as a content server, a database for storing records of information, a subscriber computer that effectively controls the main server (pertaining to and sponsored by the subscriber), even though the main server may actually be in the physical custody and under the physical administration of a third party engaged by a subscriber to provide those server services.

Meanwhile, the patron device may typically be provided by a patron to the venue and connected to the network through a browser, or preferably through an App previously loaded from the server to the patron device. The method may also include providing the requested content hosted by either the database, the main server, or the content server.

In at least one embodiment, a method may provide requested content in a plurality of languages, delivering according to user information provided in association with the patron device. The language or the authorized information suitable for and authorized for the patron device. This may be done automatically based on the previous relationship that result in the exchange of the application, and preauthorization by the patron device for the main server to use the specific information needed to sort and deliver the portion or subset of the requested content for which the patron device is authorized, or has indicated a format, language, or the like.

Such a method may also include authenticating a patron device based on the preauthorization by a patron as a user who corresponds in exclusively to the patron device. In other words, the patron device will typically pertain exclusively to an owner, the patron. Thus, authentication may typically be based on the preauthorization as well as a content identifier that identifies the content in its stored location, whatever that may be. Typically, the content identifier may be a URL that is identical to a website identifier corresponding to the requested content and to a subscriber, such as a venue owner controlling, or otherwise responsible for the content served main server.

By virtue of the physical object providing a content identifier to the patron device, mutual authentication occurs quickly, without conventional passwords, or any requirement for a login, or the like. Rather, the application substitutes for a login, and a previously authorized exchange of information and previously authorized information may control the content exchange as appropriate.

In such a system, the subscriber may be thought of as the owner of the venue, who owns and controls a website, even if that website is administered by a third party under contract. Accordingly, the subscriber will typically own the physical object, corresponding web content, and rights to the information provided by (e.g., identified by and corresponding to) the physical object.

In one alternative embodiment, a system provides by automatic, mutual authorization between a main server and a content distribution network and a patron device. A virtual private network may be made up of a main server, a patron device, and a content distribution network. The main server, content distribution network, and patron device may be operably connected to communicate over a physical network, whether a wide area, local area, internetwork (e.g., Internet) or the like. The main server may be programmed to receive from the patron device pre-authorization for subsequent communication and proprietary information of each of the three devices, as triggered by a physical object to be encountered in the future, and typically controlled by the owner of the main server. The patron device may be programmed to receive from the physical object information comprising an identifier corresponding to the physical object and corresponding to requested content controlled by the main server.

Accordingly, the patron device may be programmed to request of the main server the requested content based on the identifier, and to authenticate the main server based on the identifier and the pre-authorization. The main server, may be programmed to authenticate the patron device to receive the requested content based on the identifier and the pre-authorization of the patron device to the main server.

Thus, a content distribution network may be programmed to deliver the requested content in a format, including a selected subset authorized, requested, or otherwise deemed appropriate for the patron device, based on patron information provided by the patron device to the main server. This may be determined also, in part, by the identifier that is provided to the patron device by the physical object.

Such a system may include programming the main server to query a database based on the identifier, and to communicate to the patron device the requested content based on the identifier, but only if the requested content is based on patron information corresponding to the patron device and disclosed to the main server pursuant to the pre-authorization. Thus, content may be tailored, controlled, limited, selected, and the like without logins, passwords, and the like, the necessary information and security checks being conducted based on a previous relationship.

The system may include programming in a main server that is effective to select a subset of the requested content, based on the patron information. For example, a language may be selected as suitable for the patron device (thus the patron). Information may be retrieved from a location in a database at a particular URL, and a subset thereof may be selected based on patron information communicated by the patron device, at the time of the request, or at a previous time.

For example, an authorization may be provided as a pre-authorization at the time of downloading an App, whereas the actual information may be transmitted at another time, being obtained from a database by permission therefrom. Alternatively, or in addition patron device information may be uploaded from the patron device at the time of the request for information.

Similarly, patron information may be an indicator of language preference, a need to know controlled by some other computer not under the control of the patron device, such as an employer's database, where the request for information is based on an employee's authorization need to know. Similarly, patron information may include an authorization received from an owner of the requested information, or of the subset.

For example, a sales person may receive certain proprietary files from a main server, or as authorized by the main server. Authorization may be based on the status of that sales person in an organization. Accordingly, some level of authorization, or some status by title or other indicator may be associated with the patron device, with a database record corresponding to the patron device, its owner, or the like.

Similarly, contracts and their authorizations may be saved in a database, or in a status identification on a patron device. These provide a readable record in the database or on the patron device giving the server the information necessary to provide the appropriate subset of information to the patron device. Similarly, security clearances from government entities may be identified in databases or on patron devices in similar fashion.

In general, one or more of the hardware components in a system in accordance with the invention may store on a computer readable, non-transitory memory certain data structures. Data structures are of two types, executables that effectively are loaded into a processor of a computer to be executed (programming instructions), and operational data, which is numbers having meaning due to their formatting or location in memory and being the numerical values that are to be processed by the executables.

Thus, such a memory aforementioned may include data structures such as a main server as a software program programmed to instruct a processor to customize delivery of content between itself and a patron device operably connected thereto over a network by automatic, mutual authorization therebetween. The main server may be programmed to exchange between itself and the patron device pre-authorization for subsequent communication of proprietary information pertaining one or both of the main server and the patron device. That communication may be triggered by a physical object to be determined or encountered by the patron device in the future.

Thus, the main server may be programmed to provide, on behalf of the physical object and in response to a patron device application, an identifier constituting data identifying the main server as proxy for the physical object. Thus, the physical object may be reduced in the requirements imposed on it.

For example, a physical sign providing a code, such as a QR code, may identify to a patron device sufficient information for the patron device to launch an App, or read that data from the physical object by the application hosted on the physical object. They App may thereby access a remote server responsible for serving up the current version of the designated content data. This saves time, storage, and the complexity of maintaining information synchronized at several locations. Rather, the server serves up either access or the information itself.

The patron device App may contain instructions programmed to install on a patron device to send to the main server a request for requested content identified by a patron possessing the patron device, or simply requested content identified by the physical object to the patron device. The request contains an identifier received from and corresponding to the physical object, which also corresponds to the requested information. Moreover, typically, the server will also maintain a binding or correspondence in some type of a data table or association table linking the physical object to the requested information, often by a URL. It may also maintain a binding or correspondence between the patron device and personalized parameters that control selection of a subset of the requested information adapted to the patron, patron device, or both.

Thus, a patron device application may include a first authentication executable deliverable to the patron device from the main server and executable on the patron device to pass the identifier received from the physical object to the server upon request for the requested content. By making the identifier the identifier in the system unique to the requested information, and having in the system, such as on the database, server, index, table, or the like, the association between the server and the URL, that server alone may receive the content information, as an additional security mechanism.

Thus, having the URL is of no benefit to any other device other than the server. In other words, the URL of the data and the URL of the server may be linked. These, in turn, may be linked to the physical object or some identification or identifier of the physical object. Thus, the information may only be obtained at a time and by a method that requires proximity of the patron device to the physical object, and the linking of the physical object, the requested information, and the server together.

Meanwhile, a second authentication executable on the server may be programmed to access the requested content and a particular subset thereof based on the pre-authorization formally received from the patron App on the patron device, or from the patron device in acquiring a patron App. Such information may be stored by the database or the patron device, and may be linked to the requested content and the main server by the identifier, and the tables that maintain the association between the requested content, the main server, and the physical object.

This memory may rely on the second authentication executable being hosted on the server. The server software may thus be programmed to access user profile data in the database, or on the patron device, or both. Meanwhile, the user profile data may be linked or combined with the identifier received from the physical object to form a content access control code that provides a portion of the requested information based on the profile data, from the requested information identified by the identifier. Thus, pre-authorization received from the patron device application and stored by the database, or delivered at the time of access need not require a login such as a username, password, and so forth at the time. Thus, the speed, access, and relationships have all been negotiated in advance, and the software may do its work to provide a seamless experience to a patron touring, or wandering at will, through but a venue.

In an alternative embodiment of the method in accordance with the invention, customization of the information may be delivered to a patron on using a patron device by mutual authorization. This authorization may include exchanging between a main server and a patron device, pre-authorization for subsequent communication of proprietary information of each therebetween, to be triggered by a physical object in the future.

Exchanging between the main server and the patron device a request for requested content, the method may address a request containing a first identifier received by the patron device directly from and corresponding to the physical object and the requested content. The method may then maintain a linking of the requested content stored in at least one of the database in a content distribution network, to the first identifier and to a second identifier, corresponding in the main server. Authenticating both the patron device to the main server to receive the requested content and the server to the patron device to access patron data, corresponding to the patron device, may be based on the first identifier as a content access control code and the second identifier as a destination and delivery control code. Thereby, a server may deliver the requested content to the patron device in response to the request.

This method may include delivering requested content based on at least one of corresponding the first and second identifiers to the authenticating, and corresponding the requested information as a patron device. Moreover, a subset may comprise at least one of images, text, audio, and video presentable by the patron device. Delivering the requested content may include directing the requested content to a main server from some other storage location, such as a database, or the like.

Likewise delivering may include delivering content from a third party server, such as a CDN. Typically, a subset will be delivered, in that the subset represents some form or portion of the requested content appropriate to the patron device based on proprietary information of the patron device, the server, the information, or both. Typically, information may be tailored according to the patron device need or access authorization. Thus, authorizing by a main server a CDN to deliver requested content may be more suitable for large volumes of data (e.g., video files) best hosted on a CDN.

The physical object may be selected form a fixture installed on a location, a region of real estate corresponding to a proximity to a physical location, or be at a physical location, reading material, a vehicle, a package containing a product, a flyer or other information inside a package, or a code on a product itself. Meanwhile, signage, or even a transmitter at the physical object may contain a code providing information corresponding to the requested information, and the main server.

The method may include providing by a patron device, location data, corresponding to the location thereof. This information may be obtained from the patron device as proprietary information, or from the physical object, or may include both, which may be matched against one another by the main server when the information is delivered. Thus, authorizing by the main server the delivery of requested content may be based on location data and the content location data available to the main server and corresponding to both the subscriber and the requested content.

These may also be combined in a database record that links or corresponds the location of the physical object, the subscriber who controls or owns the main server, and the content, as well as the venue, typically, at which the physical object is located. These may be bound to the information in the data table or the like.

The method may therefore include providing a system operably connected to the main server, the CDN, the database, a subscriber computer (typically an administrative computational facility of a subscriber who has the right to control the main server), and a patron device all connected in a network. Providing by the main server the requested content corresponding exclusively to a subscriber, and therefore linked to the main server may provide additional security. Meanwhile, hosting by either a database, the main server, the CDN, or the like, the requested content may be released by the control of the main server to the patron device.

In certain embodiments and method may include providing requested content a plurality of languages and delivering the requested content to the patron device in a language selected automatically from the plurality of languages, based on the pre-authorization provided earlier by the patron device (therefore the patron). Therein, the authenticating may be based on the pre-authorization executed by the patron to which the patron device corresponds exclusively.

The content identifier may be a uniform resource locator (URL) corresponding to website controlled by the subscriber, and identified by the physical object. Typically, that website is served up by the main server. Its content may come from anywhere, including a widget hosted on the website that brings in and delivers content from the CDN. Alternatively, a widget on the patron device may actually include a window in the webpage that is delivered for viewing to the patron device, in which window the content delivered by the CDN may play or display.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
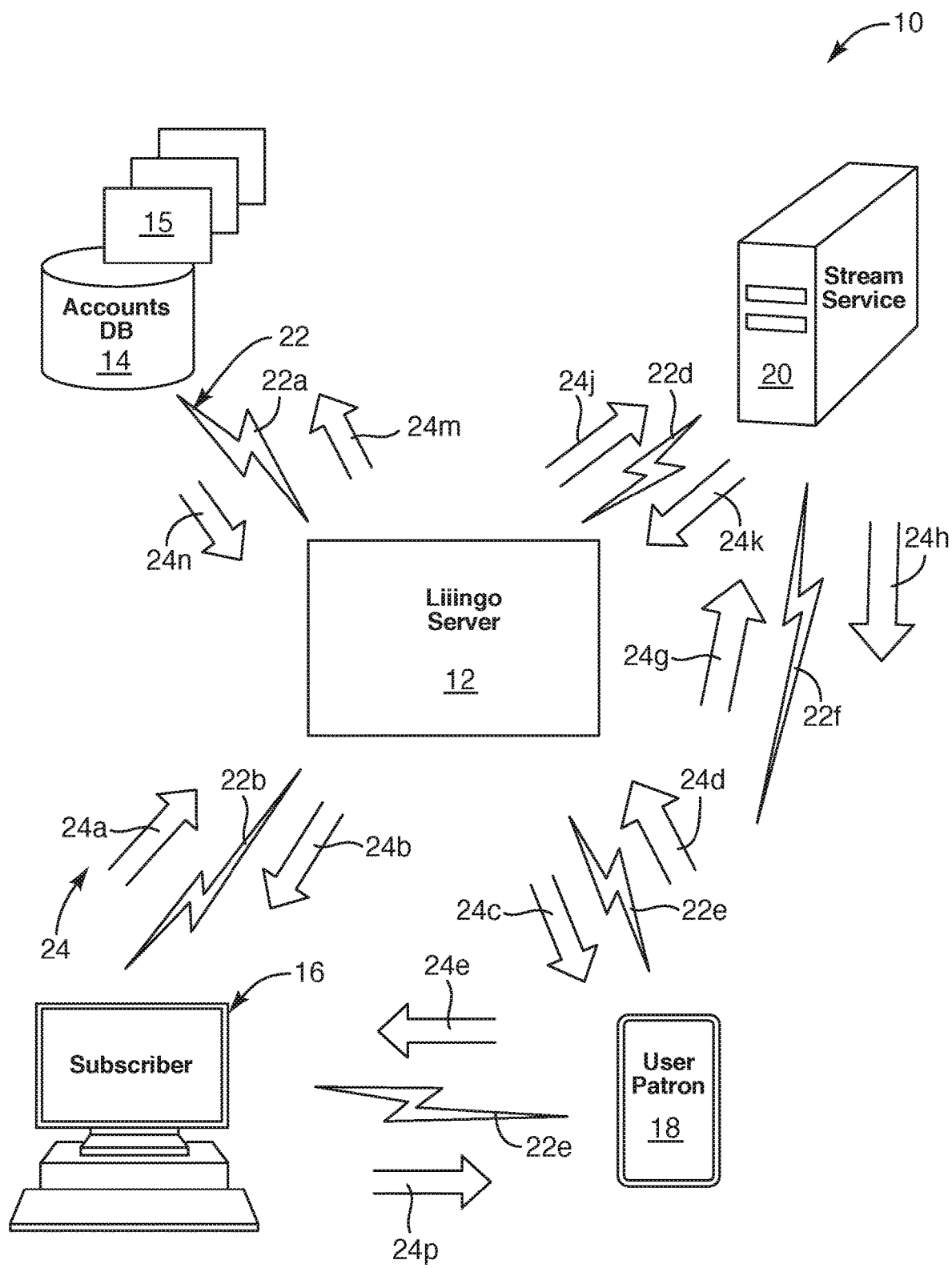
FIG. 1 is a schematic diagram of one embodiment of a system in accordance with the invention where subscribers may provide access to content through a centralized Liiingo™ server maintaining an account database of key information, and providing access to direct streaming from a remote server to an individual patron.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of systems and methods in accordance with the invention. The illustrated embodiments will be best understood by reference to the drawings, wherein like parts are designated by like numerals throughout.

Referring to FIG. 1, a system 10 includes a server 12 referred to as a Liiingo™ server 12 operates to implement the system 10 between its own subscribers 16, patrons 18 associated with those subscribers 16, and streaming services 20 engaged to serve to users 18 or patrons 18 streamed content proprietary to the subscribers 16. In the illustrated embodiment, an accounts database 14 is maintained by the server 12 as a mechanism for implementing both security, and content indexing.

In the illustrated embodiment, each of the server 12, subscriber 16, patron 18 may communicate over an internetwork 22. Links 22a through 22f illustrate communication links that may be used in practice to communicate between the entities 16, 18, 20 and the system server 12. For example, communications 24 or data 24 may pass between certain of the entities 12, 14, 16, 18, 20, where the entity may be an organization, an individual, and also the computer system 12, 14, 16, 18, 20 corresponding thereto.

Herein every alphanumeric reference refers to a specific instance of the numeric reference. Thus, a trailing alphabetical character represents a particular instance of the item identified by the reference numeral. Thus, for example, communications between the subscriber 16 and the server 12 are represented by the communication 24a. Responses or communications 24b instituted by the server 12 and directed to the subscriber 16 are represented by the communication 24b, and so forth.

In a currently contemplated embodiment, a subscriber system 16 or subscriber computer 16 may represent a computer hosting or serving up a website for a subscriber 16. The subscriber 16 may be thought of a "client" 16 of the organization or entity operating the server 12. For example, a zoo, a museum, an art gallery, a theme park, a recreation venue, or the like may constitute a subscriber 16. The subscriber 16 maintains a relationship with the server 12. For example, the server 12 may be thought of as serving or presenting a face 16 of a web presence. After all, the subscriber 16 owns a venue, hosts patrons 18, and serves up content on a website available through the subscriber 16 to patrons 18 in the general public.

However, the Liiingo™ server 12, and the organization corresponding thereto may act in any or all of three separate capacities. The server 12 may actually host the entire content, access, control, and so forth for a website corresponding to the subscriber 16.

In another alternative embodiment, Liiingo™ server 12 may actually act as a ghost behind the website of a subscriber 16. That website in such a circumstance may then be hosted by the subscriber 16 directly, or on some third party server. In such a demand, the ghost server 12 inserts certain information into appropriate locations, described hereinbelow on a web page hosted by another server 16 or the like.

In a third embodiment, the Liiingo™ server 12 may act as a broker 12. It provides control and access to content served by a streaming service 20 that is neither the subscriber 16, nor the Liiingo™ server 12. In any event, the Liiingo™ server 12 provides an element of control and access authorization for various productive reasons, also described hereinbelow.

Examples of patrons 18 will typically be guests 18 or visitors 18 to a venue owned by a subscriber 16 to the Liiingo™ server 12. Thus, a patron 18 is typically individual, sometimes a group, or the like visiting a museum, a theme park, a zoological garden, a botanical garden, or the like. Typically, the patron 18 is moving between exhibits, rides, or different micro venues within the larger venue owned and operated by the subscriber 16.

The accounts database 14 represents records 15 corresponding to subscribers 16. As a practical matter, a database 14 may include account information, certain content, and the like corresponding to a subscriber 16. However, a particular value to subscriber 16 is demographic data, used data, access information, dwell times, visited pages, and visited venues or micro venues corresponding to an individual patron 18.

Such information may typically be saved anonymously, not containing any personally identifying information. Nevertheless, demographic data may, by permission, be collected and maintained in the database 14 in order to inform subscribers 16 regarding the attractiveness, the traffic density, and the overall impressions corresponding to patrons 18.

Typical examples of streaming services may be found in current web content. For example, an application called JW Player is available, from a company of the same name. It provides hosting and streaming services for large digital content. Amazon Web Services "AWS" is another service that also provides online storage and streaming for access by patrons 18.

Figure 2:
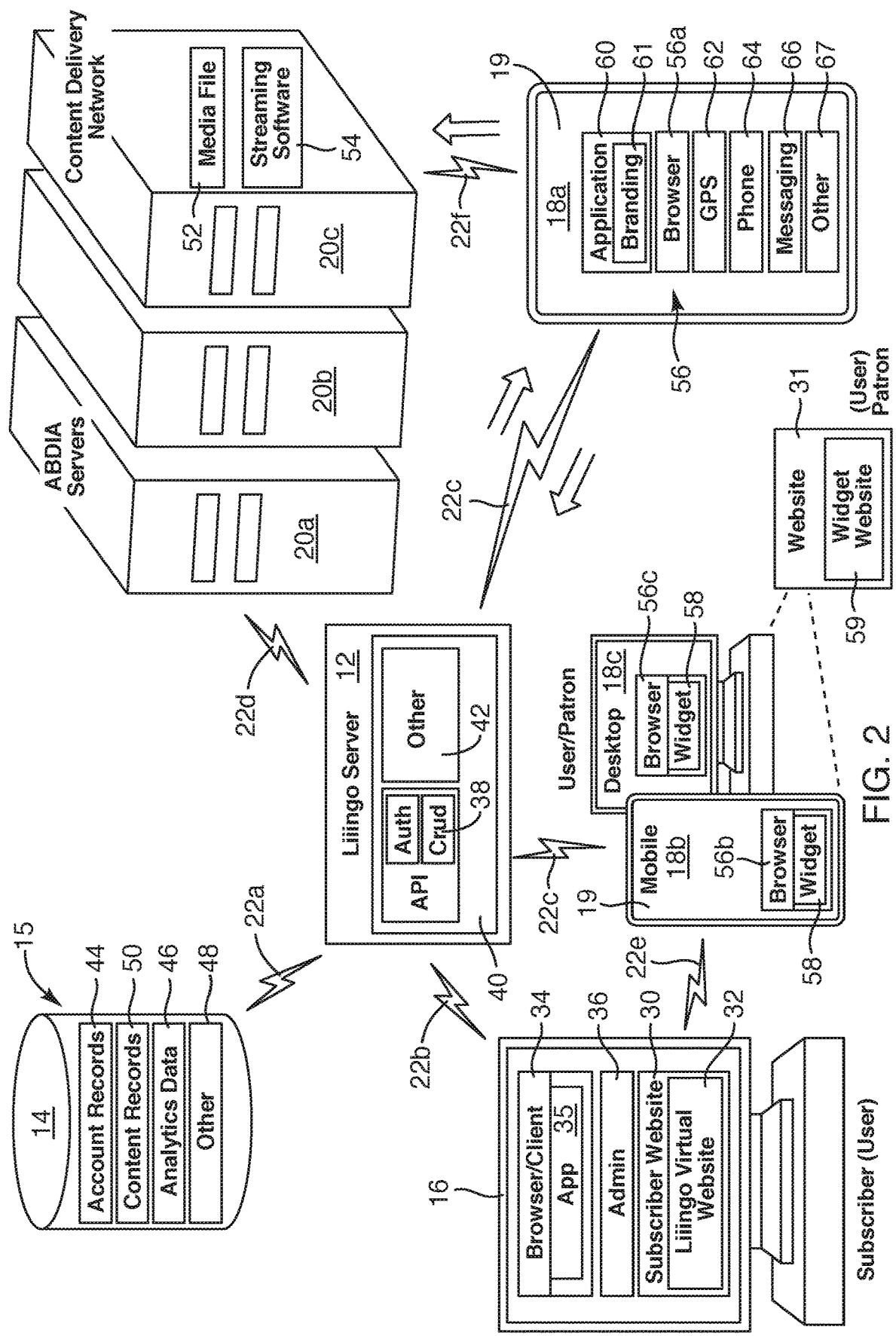
FIG. 2 is a schematic diagram of additional details of such a system, illustrating multiple platforms and access methodologies.

Referring to FIG. 2, additional architectural details are illustrated for the server 12, database 14, the subscriber 16, and the patron 18, as well as the servers 20 or services 20. For example, in the database 14, records 15 may include, for example, account records 44 correspond to the subscriber 16 and identify various relationships, information, indexing, and other useful data in accounting to and accounting for the subscriber 16. Meanwhile, content records 50 may actually contain content 50 that will be hosted, ghosted, or the like to a website of the subscriber 16, by the Liiingo™ server 12.

Meanwhile, analytics data 46 may constitute a collection of information corresponding patrons 18 in general and their access to various pages, content, and so forth on the website of the subscribe 16. Other records 48 may also be saved for convenience, for value to the subscriber 16, or to better serve patrons 18 quickly. For example, account records 44 are detailed and specific with respect to subscribers 16, and patrons 18. One may elect to save profiles as other data 48 available exclusively to the patron 18, or to the server 12. This may better serve the patron 18, and possibly the subscriber 16, in order for the subscriber 16 to better serve the patron 18 online and at the venue.

Likewise, content records 50 may include not only content, but also information relating to indexing, identifying, and quickly accessing or requesting content that ultimately is stored on the servers 20.

Figure 3:
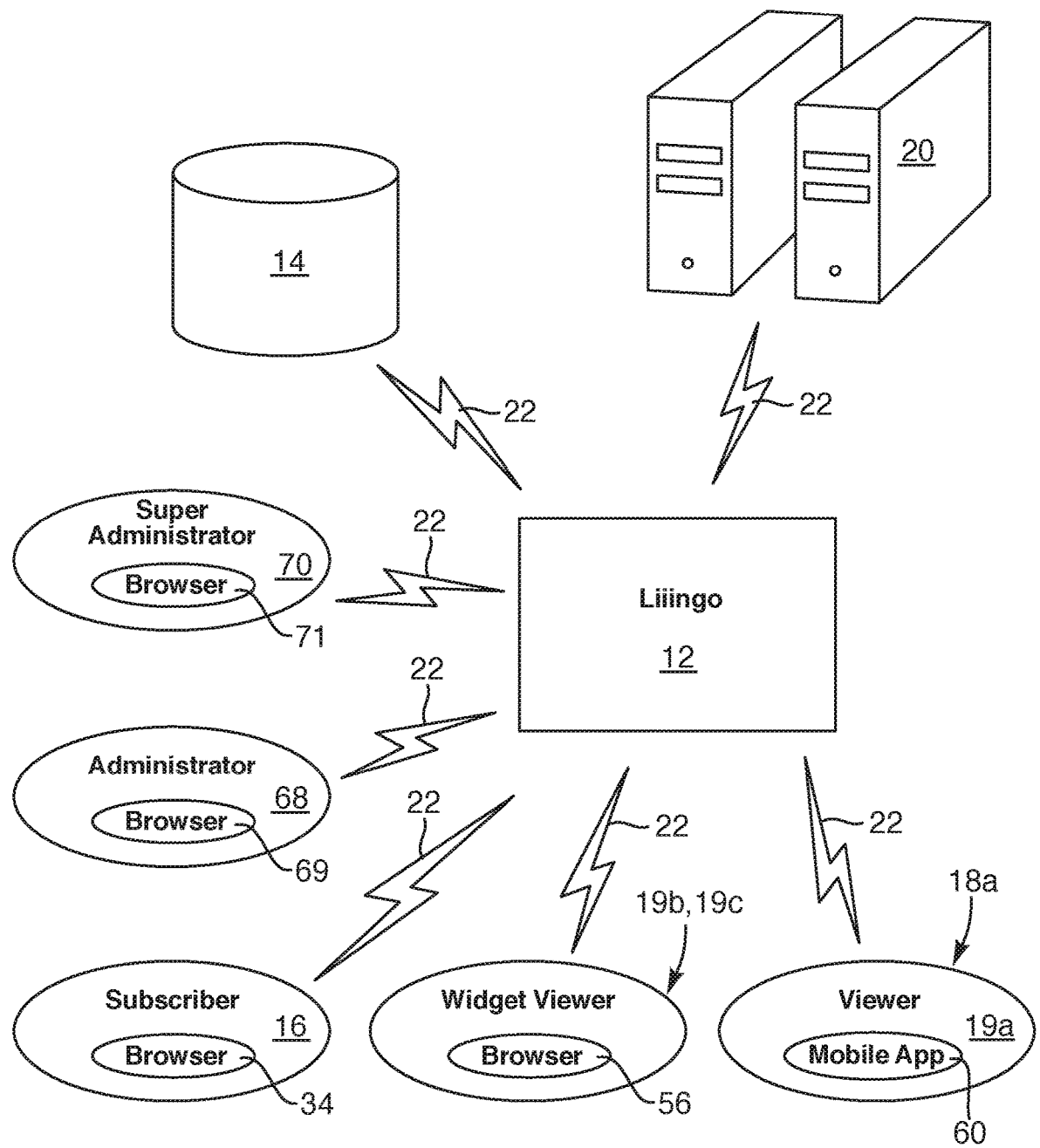
FIG. 3 is a schematic diagram of the relationships between different online personas in a system in accordance with the invention.

Referring to FIGS. 2 and 3, while continuing to refer generally to FIGS. 1 through 13, the Liiingo™ server 12 may include an application programming interface (API) 38 responsible principally for authorizations and database interactions. For example, creating records, reading records, updating records, deleting records, and the like from the database 14 will be accomplished by the server 12 on behalf of the subscriber 16 during administrative processes. These may be initiated by various patrons 18 during their access to the website 32 of the subscriber 16.

Of course, other software executables 42 are also hosted on the Liiingo™ server 12 in order to accomplish the various administrative functions. These may be programmed in any suitable format and language in order to accomplish the objectives thereof.

Turning attention to the subscriber 16, the subscriber system 16 may include a website 30. As a practical matter, a website 30 may be as simple as executable code to forward a request for access by a patron 18 to another server 12, or the like in order to serve up the website. In other embodiments, particularly as illustrated herein, the subscriber website 30 may include within it a website 32 that is effectively hosted, ghosted, or controlled by the Liiingo™ server 12.

For example, either the subscriber computer 16, or some other third party computer may host a website 30. The Liiingo™ server 12 may host the website 30. In one presently contemplated embodiment, the conventional content may be provided for a website 30 by the subscriber 16 directly or a third party, while the Liiingo™ server 12 provides embedded web services 32 and controls therefor in order to provide multiple language content.

In general, each of the devices 18a, 18b, 18c, representing users 18a, 18b, 18c, may include a browser 56a, 56b, 56c, respectively. A browser 56 is typical for any computer device that is network aware. The system 18a does not include the widget 58b illustrated in the browser 56b, 56c of the systems 18b, 18c. Rather, the system 18a hosts an application 60 and may include actual branding information 61 that shows in logos, screens, surfed pages, and the like brought up by a patron 18a. By virtue of the application 60, additional features are provided directly to the patron 18a on the device 18a.

Meanwhile, other functional features, useful to the access of the Liiingo™ server 12 and available in typical "smart phones" 18 may include a GPS software system 62 providing identification of locations, and possibly directions of motion, and the like for a system 18. Of course, a "smart phone" 18 has the functions of a phone 64, and will typically have SMS messaging 66 associated therewith, and so forth. Meanwhile, other software application 67, such as email, other single function applications from third parties, and the like may typically be hosted on the computer underlying the system 18a.

In considering the widgets 58 embedded within the browsers 56 in the units, 18b, 18c, and the widgets 58 effectively create a widget website 59 inside the website view 31 served up as the website 30 of the subscriber 16. The widget website 59, by virtue of the programming within the widget 58 provides a fully functional website 59 that operates within the website 31, seamlessly for a patron 18.

In a currently contemplated embodiment, the server 20, such as the servers 20a, 20b, 20c may include media servers 20. In certain embodiments, such as the system 20c, the server 20c is configured as a content delivery network 20c. Typically, this server 20c will host media files 52. These are large digital files of audio, video, and the like. Meanwhile, certain software 54 required to support the serving and streaming of those media files 52 is hosted and running on a content delivery network 20c.

From the system point of view, the widget websites 59, as well as the website 30 visible through the application 60 on the patron device 18a may actually be served up as streamed media files 52 directly from a server 20 to a patron device 18. Thus, by virtue of the embedded nature of the widget website 59 or widget 58 inside the browser 56 or application 60 of a user device 18, streamed media files 52 may be seamlessly available immediately, and without separate logins, access, diversion from a favored webpage, or redirecting away from the subscriber website 30 to which the patron 18 has gained access.

From a patron 18 point of view, the widget website 59 effectively fills a window on a page website 31. Again, that website 31 may be directly served up as the website 30. Nevertheless, by providing the widget functionality 59 windowed in the webpages 31 of the website 30, a patron 18 need not diverted, nor required to provide authentications, access, logins, fees, or other justifications in order to immediately access and view the content of the media files 15 to be served to the widget website 59.

Referring to FIG. 3 specifically, while continuing to refer generally to FIGS. 1 through 13, a relationship chart illustrates the "personas" or representations that may be taken on by the Liiingo™ system 12, subscribers 16, patrons 18, and the servers 20. From the point of view of a patron device 18a, 18b, 18c, a widget viewer 19a may be available on a device 18.

In the illustrated embodiment, the device 18a may be also thought of as the person 18a in possession or control of the device 18a. Thus, in this illustration, that person 18a or device 18a may be thought of as a viewer 18a. That viewer 18a as an individual person 18a or "persona" having an experience, will be looking at a device 18a hosting the mobile application 60. Through that mobile application 60, the human being viewer 18a will be able to see on the device 18a only what the mobile application 60 provides.

In contrast, the widget viewers or users 18b, 18c may be thought of as human beings 18b, 18c, or the devices 18b, 18c associated therewith as viewers 18b, 18c hosting a browser 56 that delivers all content, views, and so forth. As a result, the only information available, video available, and so forth will be that content (e.g., media files 52 available through the browser 56 to the devices 18b, 18c).

An effective limitation therefore arising is that the widget viewers 18b, 18c can only see what the browser 56 can be scripted to deliver. In contrast, the viewer 18a is capable of navigating between experiences or exhibits, and content much more freely by the use of the mobile application 60. Accordingly, the experiences are substantially different, and the content delivery is substantially greater for the mobile application 60 on the device 18a.

The subscriber 16 will typically operate through a browser 34 on the system 16. To a network, any human is that human's device, computer, etc. Accordingly, a human being 16 operating the system 16 or seen as the system 16 may access the Liiingo™ server 12 in order to administer content, relationships, and so forth to be provided and controlled by the Liiingo™ system 12. To that extent, a subscriber 16 may present a website 30 having different levels of access, control, and manipulation available. This will depend to a certain extent upon the desire for control, versus the desire for outside responsibility and reliability.

The administrator 68 may actually be the subscriber 16, or an employee thereof. In certain embodiments, the administrator "persona" 68 may be identical to the subscriber 16. However, other architectures and relationships also exist and many are preferred. For example, the administrator 68 may actually be a computer 68 and a person 68 associated with a third party. Also, for example, a company may own several theme parks, museums, zoos, or other venues. Accordingly, a single administrator 68 as a third party may operate to manage website access, content, updating, and so forth. Thus, the administrator 68 is not necessarily identical to the subscriber 16. Thus, the browser 69 may be available elsewhere to another administrator 68.

Similarly, the administrator 68 as a "persona" 68 may be offloaded to the Liiingo™ system 12 according to contract, convenience, or the like. In some respects, the "personas" 16, 68, 70 may be thought of as levels as permission, capacity, authority, and the like. For example, the subscriber 16 may administer website content, access, and so forth. However, the administrator 68 may control access by various other administrators to the website 30 creation, manipulation, control, and so forth.

In contrast, a super administrator 70 through a browser 71 may actually be the Liiingo™ server 12 or employee 70 operating as a super administrator 70 on the Liiingo™ server 12 in order to totally administer the functionality that the Liiingo™ server 12 will provide to the website 30 of the subscriber 16. Thus, this "persona" 70 effectively can control, impersonate, authorize, or otherwise implement any authorizations and functions of any other administrator 68, subscribe 16, or the like.

Figure 4:
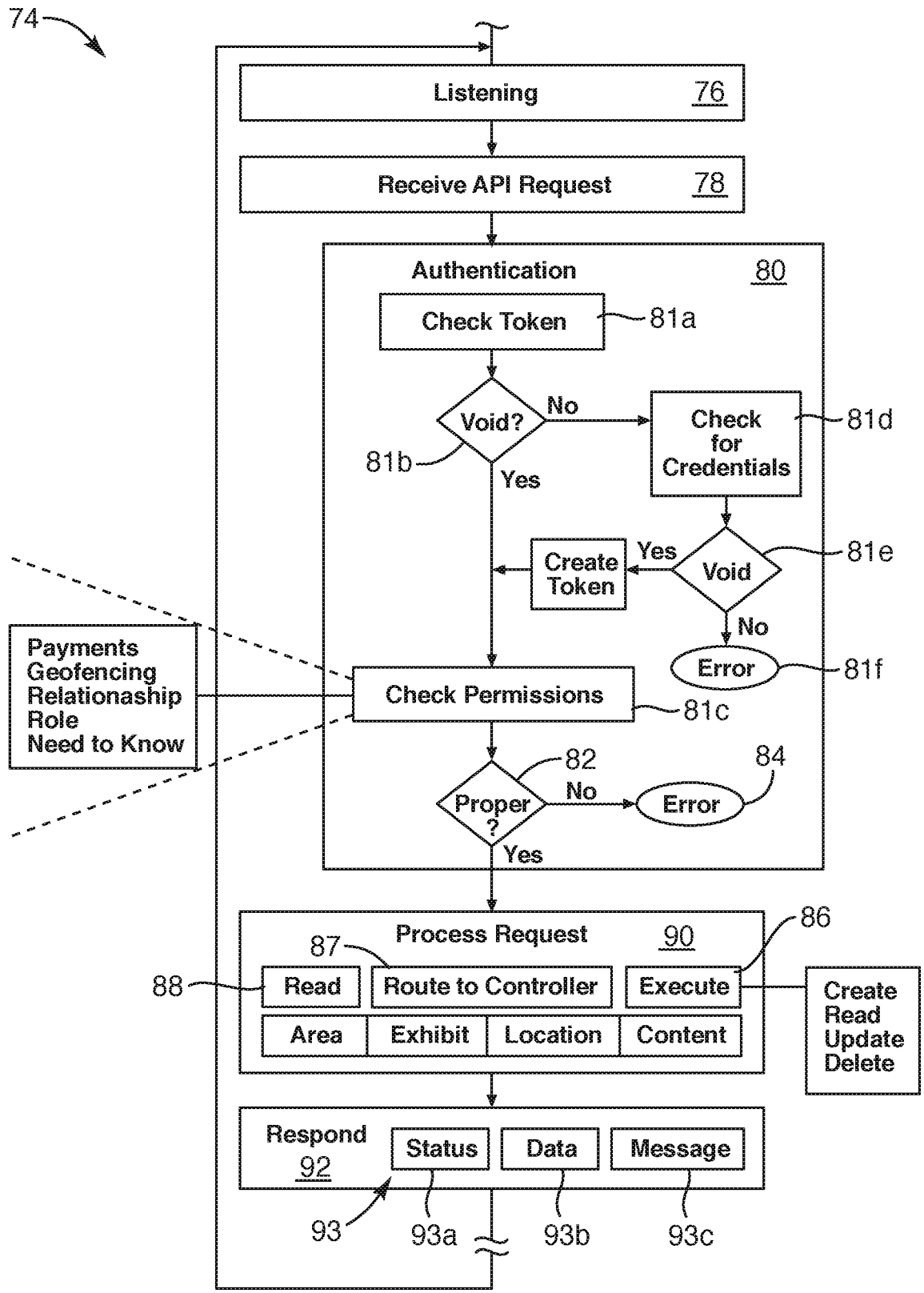
FIG. 4 is a schematic block diagram of one embodiment of an authentication process in accordance with the invention.

Referring to FIG. 4, while continuing to refer generally to FIGS. 1 through 13, a process 74 or method 74 of operation for the Liiingo™ server 12 may include listening 76 for requests from "clients" in the computer sense of clients being served by a server 12. Upon receiving 78 a request, the server 12 will authenticate 80 by checking 81a anyone for a token, which, if valid when tested 81b, will move on to checking 81c for permissions or permission levels, permission topography.

If not valid in response to the test 81b, then the server 12 will check 81d for credentials, which when tested 81e will be rejected with an error 81f if not valid. If the credentials are valid when tested 81e, then the server 12 will create 81g a token which then will be passed to the check 81c of permissions. If permissions, when tested 82, are proper, then the process 74 continues to the processing 90 of the request. If not, then the test 82 results in an error 84 and rejection of the request.

Processing 90 will typically involve executing 86 a request, if the request is for operation of an executable instruction 86 or execution 86, then, the processing 90 may include creating, reading, updating, deleting, and so forth a record. That record 15 may be any of the records 44, 46, 48, 50 stored in the database 14. For example, records 15 may correspond to particular areas of a venue. Typical exhibits or stops, sometimes referred to hereinabove as micro venues within the overall venue, and so forth. Meanwhile, records 15 may correspond to a specific location in the venue, or content corresponding to any of the foregoing areas, exhibits, locations, and the like. Accordingly, execution 86 may activate the controlling software of the database 14 to create, read, update, delete, and so forth records 15, according to the "persona" 12, 16, 18, 68, 70 that has sent a request 78 being processed 90.

In certain embodiments, the processing 90 of a request 78 may involve routing 87 to a controller. As a practical matter, the system 10 may include various computation of facilities that are capable of executing 86 instructions.

For example, processing 90 may begin with routing 87 a received 78 request to the database 14, for creating, reading, updating, deleting, and so forth. By the same token, routing 87 may also sent instructions to the servers 20 to instead execute 86 by reading content out to an administrator 68, 70 or subscriber 16. Likewise, information may be read out to any particular patron 18 or patron device 18.

In the illustrated architecture, responding 92 may be thought of as reporting 92 by the API 38 as a result of the processing 90 undertaken. Information 93 reported may include, for example, status 93a, specific data 93b, a message 93c, a combination thereof, or the like. For example, responding 92 may simply include reporting a status of information, a device, or the like as a result of execution of the request process 90.

It may appropriate to return specific data 92 that has been read during execution 86 in order to respond 92 to a request. Similarly, a message may be a response 92, such as the errors 81f, 84, or messages indicating completion, failure, or content corresponding to the request. The responding 92 effectively applies to access, both regular administration 68 and super administration 70, as well as access by patrons 18.

Figure 5:
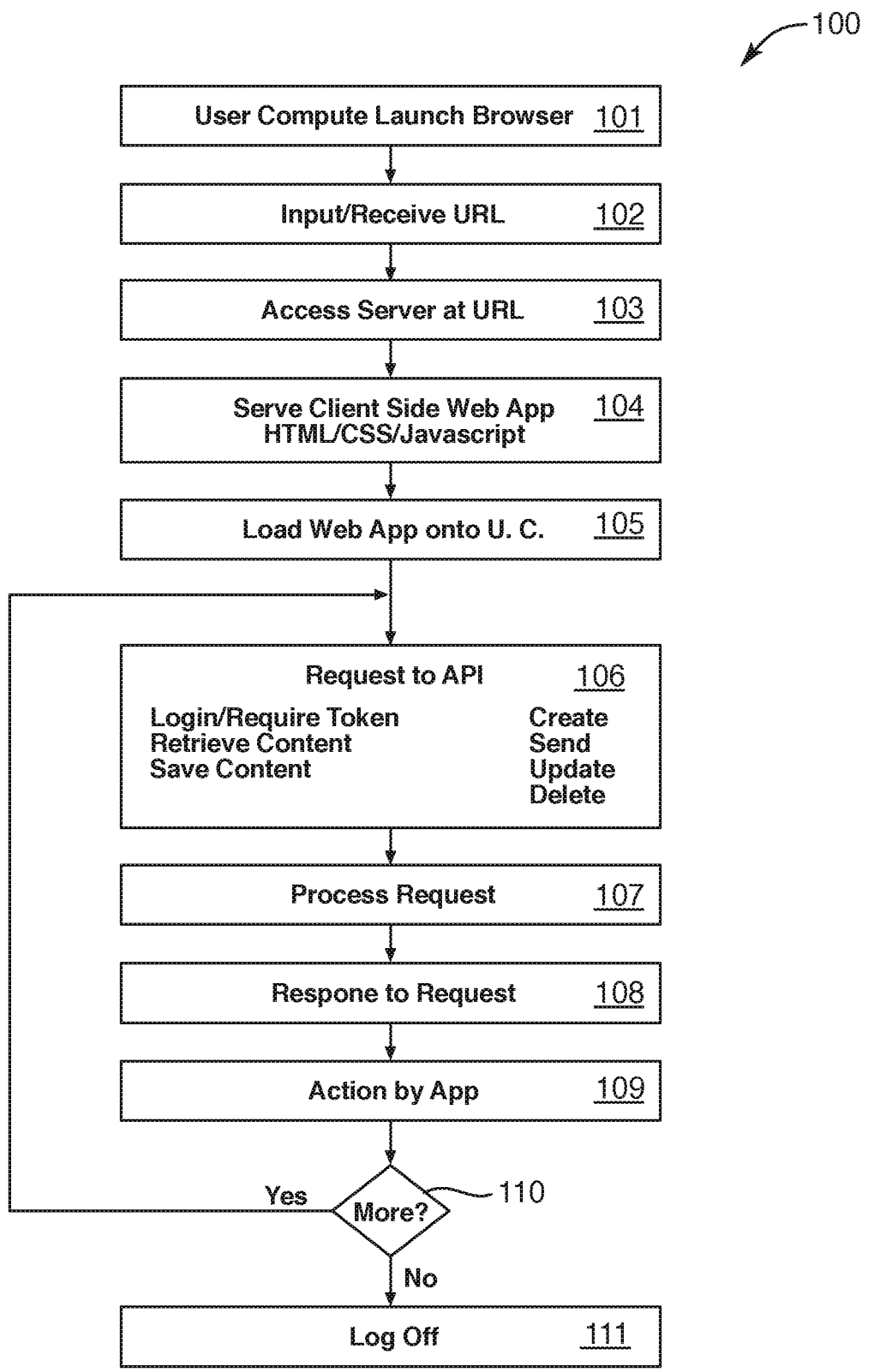
FIG. 5 is a schematic block diagram of a subscriber-administrator interaction process in accordance with the invention.

Referring to FIG. 5, a process 100 for interaction 100 between a subscriber 16 or administrator 68 on behalf of a subscriber 16 with the Liiingo™ server 12 is illustrated. For example, the process 100 initiates on a user computer 16 launching 101 a browser 34. A uniform resource locator (URL) may be input 102 or otherwise receive 102 by the browser 34.

In the illustrated embodiment, after receiving 102 a URL, the browser 34 accesses 103 the server 12 at that URL. The Liiingo™ server 12 in a computer context treats the browser 34 as a client 34 to the server 12. Thus, the server 12 now serves to the "client side web application" of the browser 34 the requested material located at the URL. This may be in HTML file of code, instruction, or content, a CSS file, a java script, or the like. By serving 104 this content to the browser 34, the administrative computer 16 may load 105 a web application onto the computer 16.

The server 12 serves a web application to the browser 34 to be run. This application may be constituted in an HTML file, a CSS file, Java™ script, or other suitable language, code, instruction set, or the like. Upon receipt, the computer 16, by way of the browser 34 or otherwise, may load the web application onto the computer 16. Loading 105 may mean various mechanisms.

For example, a web App may simply run in the browser 34. This is one currently contemplated embodiment that effectively may window a web application, generating a website 32 within the website 30, or within the browser 34. In other embodiments, loading 105 may simply involve executing a script in the browser 34 that engages activities of other systems.

For example, an administrator 68 or subscriber 16 is most interested in effecting changes and updates in the information for the content records 50 stored in the database 15 or streamed from the servers 20. In contrast, an individual patron 18 is more interested in accessing the website 30 of the subscriber 16.

In the illustrated embodiment, the loading 105 of web app, or the web App 105 loaded 105 will typically provide the screens, menus, dialog boxes, forms, and the like assisting a subscriber 16 or other administrator 68 in creating, reading, updating, and deleting content records 50 or other records 15, such as account data 44, or analytics data 46 stored in the server 14.

To this end, a request 106 may be sent from the subscriber 16 to the API 38 on the Liiingo™ server 12. That request 106 may be, for example, a login, a new access requiring a token or requesting a token, retrieval of content for review, saving content that has been edited, or deleting content. It may be the general create, read, update, and delete functionality desired by the subscriber 16 with respect to any data 15 stored in the database 14. Data may simply be pointed to or directed to by data 15 in the database 14, or by the Liiingo™ server 12. This may specifically refer to media files 52 that are typically not hosted in the database 14, nor on the server 12, but rather served up by third party servers 20 able to stream such large digital data files.

In response to the request 106, the server 12 will process 107 the request 106, and respond 108. Typically, this simply involves the execution 86 of the instruction, or other processing 90 as described immediately hereinabove. Action 109 by an application 35 operating in the browser 34, or otherwise on the subscriber system 16 may involve any other activity that is required.

For example, administrative work occurs in finances, management, personnel, and so forth. As a practical matter, a system 10 is focused primarily on the maintenance on content and the access thereto by patrons 18. To that end, the subscriber 16 may execute actions programmed into the application 35 for any of the foregoing purposes or others. A test 110 simply determines whether more activity is to proceed, which would result in the request 106, processing 107, and responding 108a, 108b. When the test 110 determines that no further actions are required, then the system 16 may log off 111 from the server 12.

Figure 6:
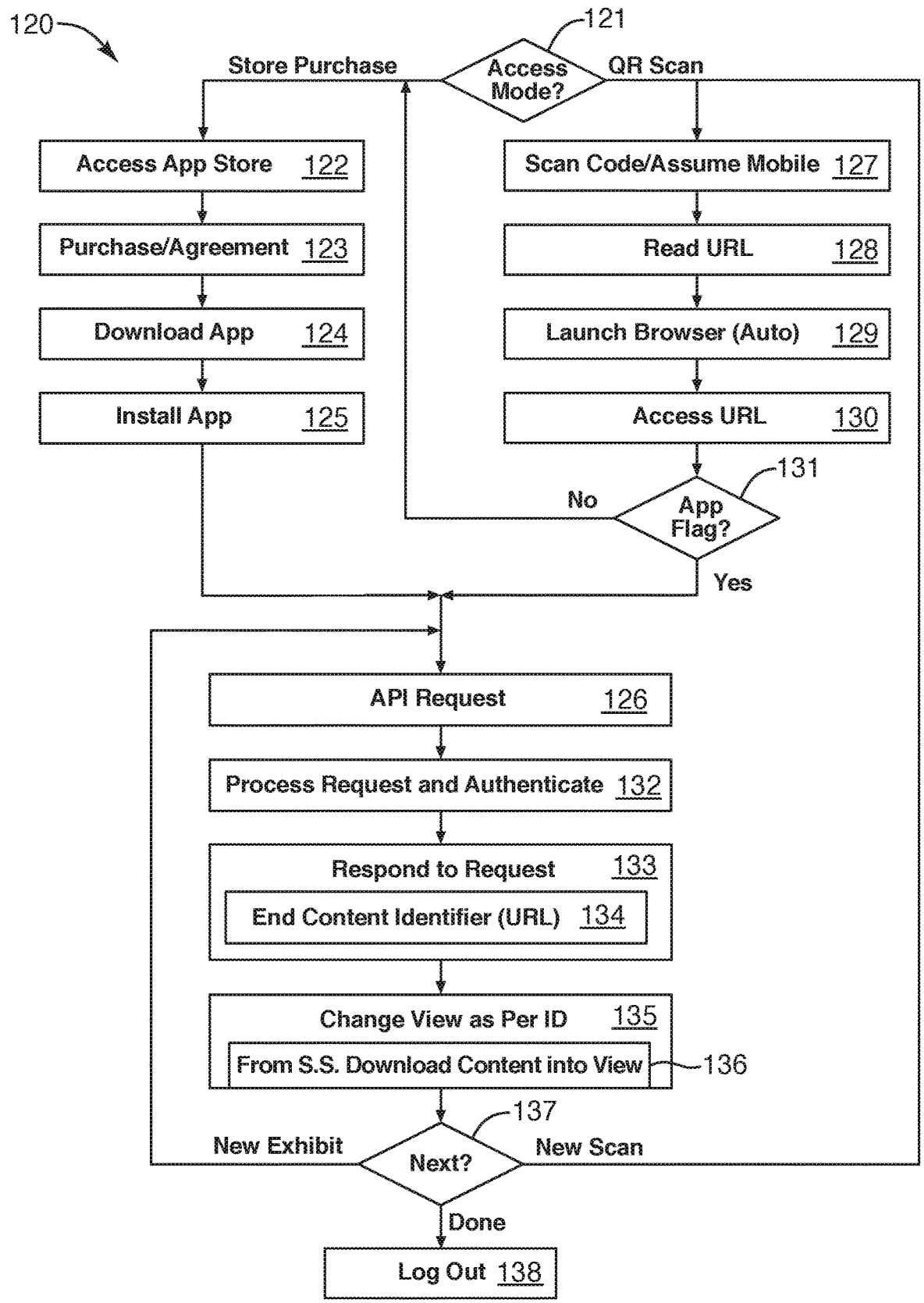
FIG. 6 is a schematic block diagram of a patron-user interaction related to a mobile application installation and use.

Referring to FIG. 6, a process 120 for interaction between a patron 18 and the Liiingo™ server 12 may first test 121 for the access mode. For example, if a store purchase is required for an application (APP) then access 122 to an App store such as the iTunes store, Apple App store, Google play store, Kindle store, or an Android store, or the like may provide access to various applications that are programmed to run on mobile devices 18. After executing 123 a purchase agreement, or purchasing 123, an application 60, the system 18 will download 124 the application 60, and install 125 the application to run on the device 18. At that point, API requests 126 may be made If, on the other hand, an access mode is by scanning 127, or some other input, then an application 60 might not be available, or may already be loaded. For example, the accessing 122 may imply preparation in advance to visit a venue. Accordingly, the accessing 122 may be completed in response to an interaction of a patron 18 with a website 30 of a subscriber 16. On the other hand, a user 18 may have already loaded by accessing 122, purchasing 123, downloading 124, and installing 125, an application 60 in advance that is more generic or generally applicable to multiple venues.

Thus, by scanning 127, as an access mode 127, the scanning 127 may be done by an application 60 that is already loaded on a patron device 18, or may be simply accessing with a typical QR code by a scanning application. Some third party or other party code may simply provide information.

By whatever mode, scanning 127 may be done onsite at a venue operated by a subscriber 16. Accordingly, the process 120 can usually (but need not) be certain that it was not a desktop computer, but rather a mobile device 18 that scanned 127 the code of interest.

From that code, a URL will be provided which may then be read 128 from the scanning 127, resulting in launching 129 a browser 56 on a patron device 18. The browser 56*a* will typically launch 129 and immediately try to access 130 a URL, upon having read 128 that URL.

At this point, the process 120 will look for an application flag. Accordingly, the test 131 determines whether an application flag is available on the patron device 18. For example, if a patron 18 already has an application 60 loaded, corresponding to the system 10, then the App flag test 131 results in continuing immediately to requesting 126 from the API 38 some functionality.

If no App flag results or is detected in the test 131, then the process 120 must return to the other branch of the process 120 to access 122, purchase 123, download 124, and install 125 the application 60. By either mode, a patron 18 arrives at the ability to submit an API request 126 to the API 38.

At this point, it may be well to refer back to the relationships of the various "personas" described with respect to FIG. 3, and referring to the entities and devices of FIGS. 1 and 2. Effectively, a patron 18, by any mode on any computer, can, through a browser 56 access a website 30 corresponding to a subscriber 16. However, to obtain the enhanced benefits provided by the Liiingo™ server 12, a patron 18 is effectively always directed to obtain and load the application 60.

Thus, one may think of the left side branch described immediately hereinabove in the process 120 as pertaining to the patrons 18*b*, 18*c* of FIG. 2. In contrast, the right hand branch of the process 120 described immediately hereinabove pertains to the patrons 18*a* and the patrons 18*b*, 18*c*, but will direct the patron 18*a* with an App 60 already loaded immediate to API requesting 126.

In contrast, either of the patrons 18*b*, 18*c* passing through either the right or left branches of the initial process 120 will be directed to access 122, purchase 123, download 124, and load 125 the application 60 in order to obtain the benefits of the Liiingo™ server 12.

Now, what are some benefits of the Liiingo™ server 12? In a nutshell, prior art systems are programmed in a suitable language, such as HTML (hypertext markup language) to execute on browsers 34, 56 on various computers. Necessarily, programming is complex, and adapting to differing circumstances is difficult.

For example, the term translation is often used for language. The concept of "localization" is often used with respect to not just language, but dialect, within a language, as well as cultural awareness. Also, for example, certain words may be completely correct, but not commonly used, and therefore not well understood. An immediate difference noted in the English language is the difference between the use of the English language in the United Kingdom, Australia, Canada, and the United States. Specific terms, specific expressions, and the like may be appropriate in certain circumstances, and offensive in others, typically based upon the localized customs, and vocabulary.

Likewise, American Sign Language is a language. Similarly, sighted persons 18 or patrons 18 may watch video. Unsighted persons 18 or patrons 18 may be limited to audio, and local braille signage. Providing translations in languages other than a single local language is not well nor easily done by most websites. For example, one may look online at major worldwide organizations, and find that their websites are not a single website, but an entirely separate website and URL for each language provided.

In a system 10 in accordance with the invention, languages may be changed and served up by the Liiingo™ server 12 by way of virtual or embedded Liiingo™ websites 32 on the website 30 of a subscriber 16, or on widgets 58 within browsers 56 on multiple devices 18*b*, 18*c*, or by applications 60 hosted on patron devices 18*a*. Thus, what is provided is not a different website 30, but a website 32 within a website 30, which embedded website 32 is served up by the Liiingo™ server 12, directly.

Upon submitting an API request 126, the patron 18 waits for processing 132 of that request 126 by the server 12. That processing 132 includes authentication of the access or right of access of the patron 18. Typically, at this step 132, authentication 80 may simply that as described with respect to FIG. 4. The Liiingo™ server 12 then responds 133 as described hereinabove with respect to the subscriber 16 or administrator 68, but with an entirely set of permissions.

For example, the Liiingo™ server 12 may send 134 a content identifier, such as a URL, to the application 60 on the patron 18*a*. In an alternative embodiment, the Liiingo™ server 12 may send 134 a script to the widget 58 on the browser 56*b*, 56*c* of the patron 18*b*, 18*c*. That script, may then be executed by another computer, such as one of the servers 20 to provide in the widget website 59 inside the website 31 the content requested.

As a practical matter, the process 120 is effectively an interaction between a patron 18 and the Liiingo™ server 12. The upper portion of that process 120 have effectively guided the patron 18 into the condition of having a loaded application 60 on the patron 18. Thus, typical embodiments will all send 134 the content identified back to the application 60 running on the patron 18.

Accordingly, the patron device 18 will then change 135 the view the application 60 is presenting on the screen 19 of the patron device 18. Typically, that changing 135 also embodies downloading 136 content corresponding to the given URL served by the servers 20. That content may continue to play, or otherwise be displayed on the screen 19 of the patron 18.

As an individual moves to a new exhibit, the test 137 of what is next may basically move back to the new API request 126 in the process 120. If, instead, the patron device 18 moves to a location that provides for a new scan, then the next test 137 returns the user 18 back to scanning 127 a code, and the right side of the upper portion of the process 120.

Again, at this run through the steps 127 through 131, the application flag should be set to indicate that the application 60 is running on the patron 18, and thus quickly and immediately return to an API request 126 in accordance with the new scan 127. When done, the patron 18 may log out 138 and close the application 60 or move elsewhere.

Figure 7:
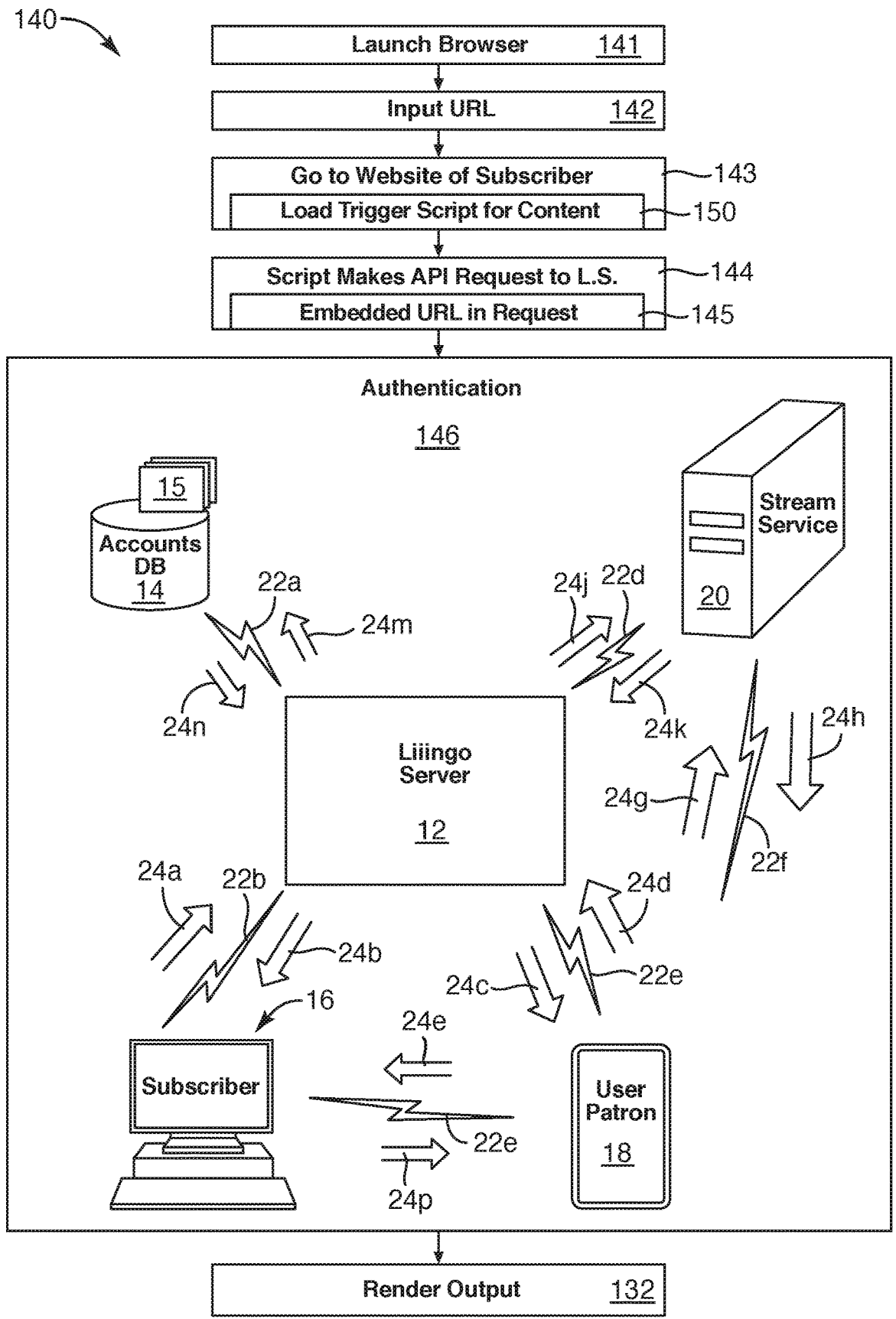
FIG. 7 is a schematic block diagram of a patron or user interaction with the Liiingo™ server through a widget implementation.

Referring to FIG. 7, a patron 18 or user interaction 140 is illustrated as a process 140 for operation through a widget 58 hosted on a browser 56 on a mobile device 18 or patron 18 that is not equipped with the application 60. This may result when an individual does not have the application 60 otherwise available, or has elected not to download 124 the application 60 when invited during the process 120.

For example, the patron 18*c* illustrated in FIG. 2 refers to a desktop, typically a fixed patron 18 or fixed patron device 18. An individual operating such a patron device 18*c* may not even be at the venue corresponding to a subscriber 16, but may be at home or elsewhere.

A user 18 operating on a patron device 18*b*, 18*c* may launch 141 a browser 56*b*, 56*c*, respectively, and input 142, or otherwise provide 142 a URL. The browser 56 will then navigate 143 or otherwise "go to" a website 30 of a subscriber 16. In the illustrated embodiment, going to that website may typically load and trigger a script written to deliver content from the servers 20 directly to the patron device 18b, 18c.

In this embodiment, the script 150 makes 144 a request through the API 38 on the Liiingo™ server 12. That is, the script has embedded 145 therein, in advance, a URL and is executable to make 144 the request of the API 38.

By "executable" is meant code containing programming language instructions effective to instruct a computer to conduct some computer operation. The script 150, rather than executing on the patron device 18, or on the subscriber device 16, through the website 30, is effective to communicate with and instruct the server 12. The server 12, in turn, then conducts the requirements to authorize and to authorize access by the patron 18b, 18c and to instruct the server 20 to deliver to the patron 18 the requested content. After the script 150 makes 144 the API request to the Liiingo™ server 12, delivering the embedded URL 145 contained in the script 150, the Liiingo™ server 12 conducts a reverse authentication process 146. The reverse authentication process greatly simplifies access, while greatly improving security seamlessly to a patron 18.

For example, a user 18 or patron 18 does not have to navigate away to some other service or website. Rather, the patron 18 has a seamless delivery of content in a language or other context suitable and desired. Otherwise, the subscriber 16 would have to set up different websites and maintain duplicate efforts to build and support them as done in prior art systems.

Alternatively, the user 18 or patroon 18 would have to navigate away to other sites in order to obtain translations. The state of machine translation is not particularly well adapted to transitory users 18. For example, Google translator provides a form of translation, somewhat closer to transliteration that will typically require clean up by a user 18. However, it is not able to reliably and precisely translate words and phrases from one language to another. Likewise, there is no system known to the inventor's at this point that provides accurate nor precise translation from voice to voice in multiple languages nor that provides any mechanism to achieve it.

Multiple websites would have to be accessed in order to provide a voice to language transcription, another application would have to be engaged to conduct a translation between a first language and a second language, and then a reader application would have to read in the second language the text to which something has been translated. This is totally ineffective. Not only does such a system not exist, the systems that do exist to do any one step are not compatible, and do not have interfaces for each other.

The amount of information lost in translation makes the output literally laughable in its inaccuracy. Thus, the resources are not available to a patron 18 by any mechanism to obtain a translation of material provided on a website 30 by a subscriber 16. The ability to host multiple language content and still maintain substantially the same webpages on a website 30 by a subscriber 16 is also not available.

Using a widget 58 or the application 60, the Liiingo™ server 12 may serve up the embedded website 59 inside a website 31 on a patron device 18 with the language translation content properly done by any means desired, whether machine, human, or machine aided human, or human edited machine translation. Thus, the seamlessness desired for a patron 18 is provided, while the simplicity of maintenance and administration is simplified for the subscriber 16.

Meanwhile, a minimum amount of data, a minimum amount of service serving server software for serving up the website 34, and other efficiencies immediately accrue. Moreover, all the supporting software for the support of the website 30 is the same for a single website for a single subscriber 16, without having to host multiple websites. This efficiency, of software and data storage, combined with a seamless experience of the patron 18, provides numerous advantages to the present architecture over prior art systems available.

Figure 8:
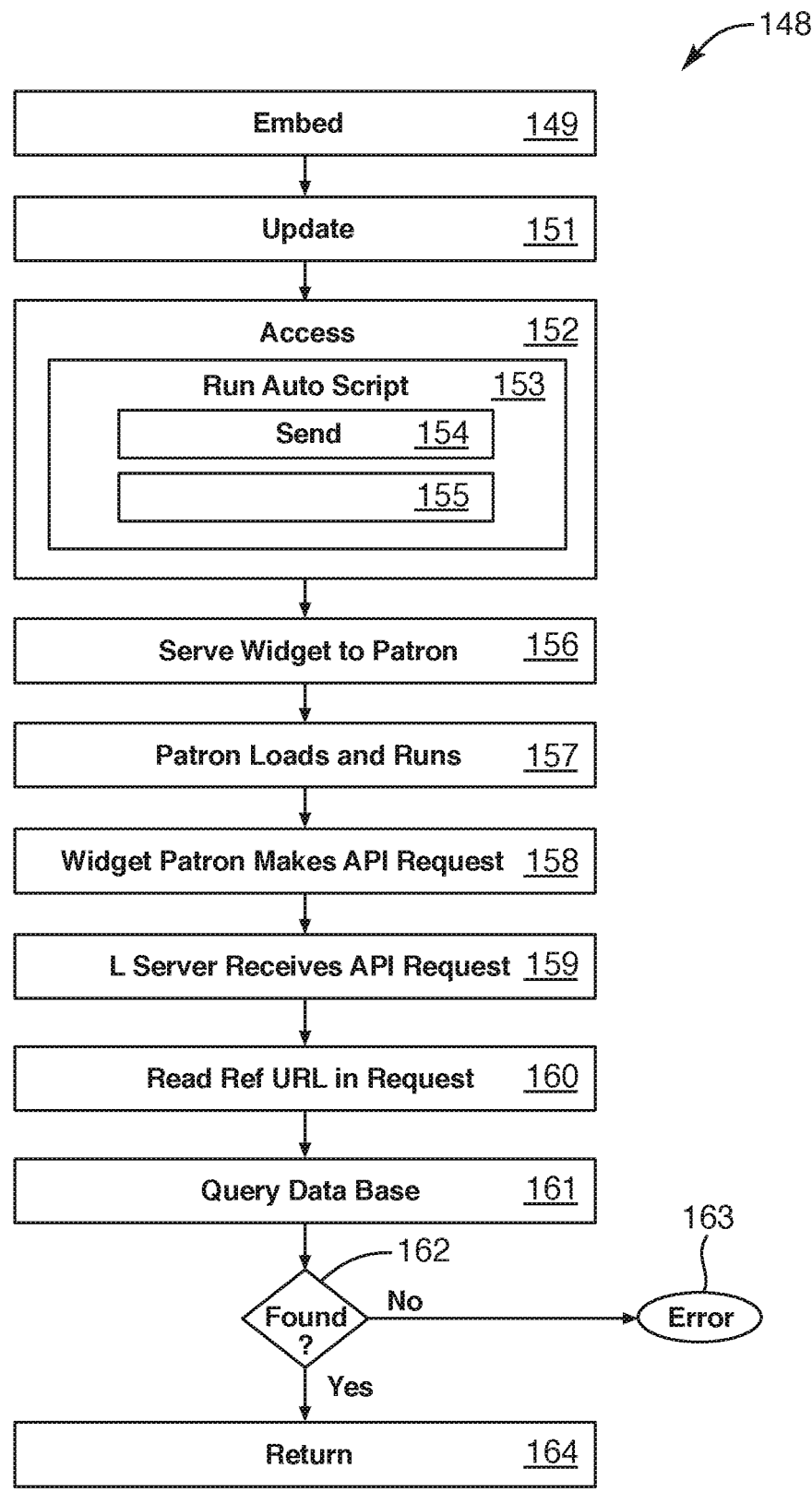
FIG. 8 is a schematic block diagram of an embedded authorization process in accordance with the invention.
Figure 9:
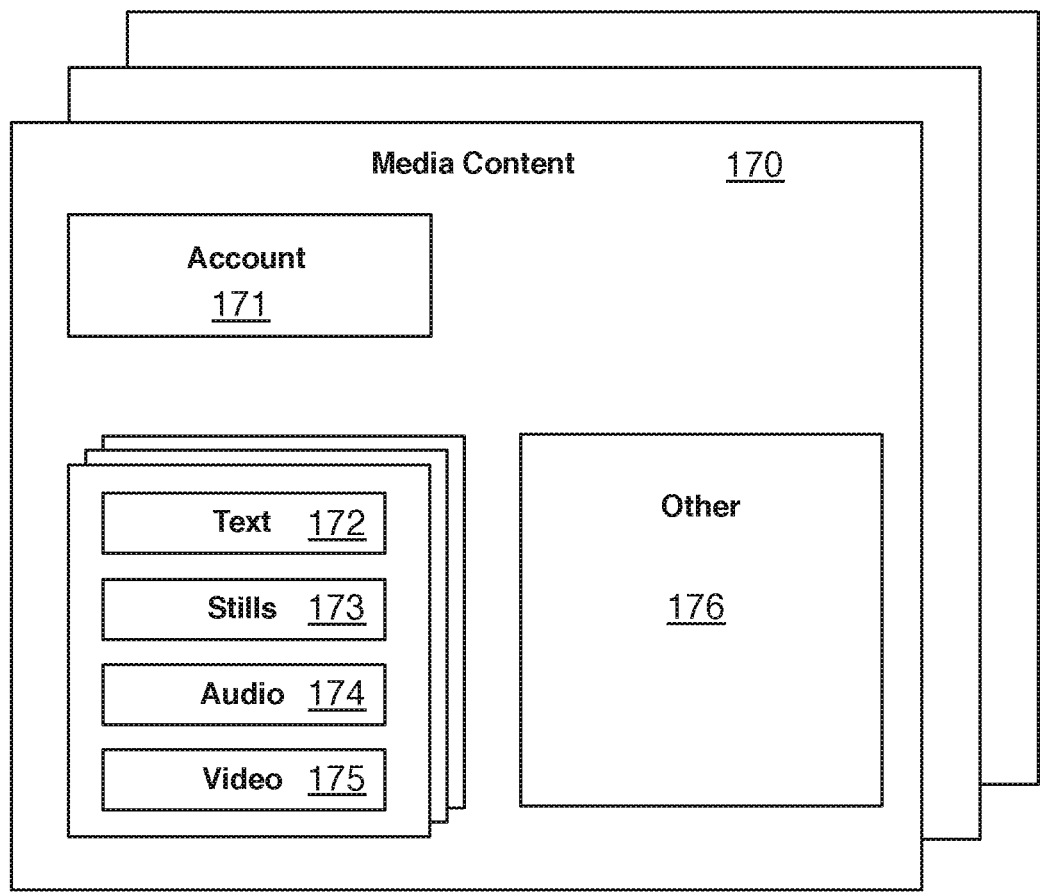
FIG. 9 is a schematic block diagram of media content records for use in a system and method in accordance with the invention.

The Liiingo™ server 12 is responsible to maintain security of access to the database 14 and the servers 20. Unauthorized access is to be avoided, but frequent logins, passwords, and the like impose the entire panoply of website registration or point of sale registration, and the like on a user 18. Here, the burden on security is shifted away from the patron 18 and is embedded in the processes of the Liiingo™ server 12. The access experience of the patron 18 controls the content available on the database 14, servers 20. Both occur by way of the website 30 ostensibly provided by the subscriber 16. The experience may be completely seamless with not even a single login, by use of a reverse authentication process 146 within the interaction 140. The details of the step 146 are illustrated in FIG. 8. Once authentication 146 has occurred, then the patron device 18 renders 147 the output received in response to the script 150 provide the embedded URL 145 through the access 143 and request 144.

Referring to FIG. 8, one embodiment of an authentication 146 may include a process 148, the authorization process 148 begins with embedding 149 of a script 150 involves the embedding a Liiingo™ server 12 script 150 into the subscriber website 30 of a subscriber 16. When the patron 18 accesses the website 30, and renders it on a screen 19 of a patron device 18, the script 150 automatically instructs the Liiingo™ server 12 to execute that script 150.

At that point, the subscriber 16 has continually updated 151 content and URL's on the server hosting the website 30. When a patron 18 accesses a webpage on the website 30, the script 150 automatically runs on the Liiingo™ server 12. It provides an external check and effectively instructs the Liiingo™ server 12 to download the widget 58 to the browser 56 of the patron 18.

The widget 58, then immediately instructs the browser 56 or causes the browser 56 of the patron 18 to send an API request with the embedded URL 145 to the Liiingo™ server 12. Thus, ongoing updating 152 is conducted by the subscriber 16, by whatever administrator 68, and accessing 152 by the patron 18. The website 30 effectively runs 153 the script 150, sending 154 the embedded URL 145 to the Liiingo™ server 12.

Upon embedding 149 of a script 150 in the website 130, the continual updating 151 continues until access 152 by a patron 18 to the website 30 of the subscriber 16. Upon access 152, the script 150 embedded is immediately run sending 154 a request to the Liiingo™ server 12. The Liiingo™ server 12 then serves 156 back to the patron 18 a widget 58 that is then embedded within the browser 56.

The patron 18 then loads and runs the widget 58 creating a widget website 59 within the website 31 viewed by the browser 56 of the device 18. The widget 58 at this point makes 158 an API request on the Liiingo™ server 12. The Liiingo™ server 12, then receives 159 and reads 160 not only the API request received, but the URL 145 embedded in the script 150 initially.

The Liiingo™ server 12 then queries 161 the data base 15, specifically looking at account records 44, to find that particular URL in a URL field in an account record 44. If that URL 145 is found in the account record 144, it will identify an actual URL location on the website 30, or in the Liiingo™ server 12, and often in a server 20. Finding the URL, which is itself a very long string of characters, thereby serves as a cryptographic key or code or password. It is not guessed at a reasonable time by any reasonable amount of computation, and is originated with the subscriber 16. Possessed by the patron 18, it provides a secure, recognized password.

Now, if the URL 145 is not found, an error 163 is reported. If the URL is found, then the patron 18 has been validated or authenticated by virtue of information that has been passed to it immediately and directly by the subscriber 16, and clearly indicates authorization. Thus, the results found at the URL 145 are then returned 164 by the appropriate server 20, or alternatively a server 12, 14, 16.

Typically, secure access to the remote servers 20 is well implemented without redirecting or relogging by a patron 18. By the automated serving 156 of the widget 58, and the automatic embedding 149 of the URL 145 as well as the seamless embedding of the script 150, the patron device 18 exercises control it otherwise could not have without complex and repeated logon activity to access the various servers 12, 14, 16, 20. However, by a system and method 146 in accordance with the invention, that access is provided seamlessly and powerfully to the patron 18.

Referring to FIG. 9 and FIGS. 1 through 13 generally, corresponding media files may include information corresponding the media files 52 to subscribers 16. Indexing, names, contact information, passwords, rules for distribution, and so forth may all be included in accounting information 171. The typical content 170 of most interest is files containing text 172, images 173 such as stills 173, audio 174, video 175, and the like. Other information 176 may also be stored.

One principal value of a content delivery network 20c is the facility for storing and serving large amounts of digital content (172 through 175) desired by a patron 18. It is impractical to store, manage, or serve such on a comparatively small subscriber system 16. Even a database server 14 is often not well adapted to including the media files 52 and binary large objects (BLOBS) in the data 15 stored in the database 14.

Figure 10:
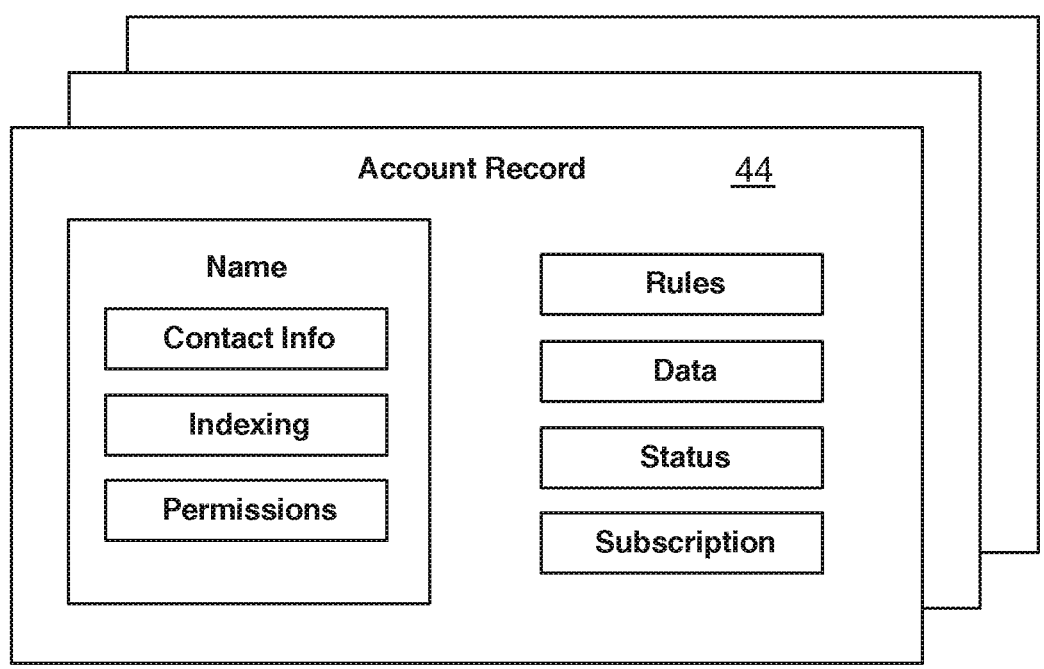
FIG. 10 is a schematic block diagram of one embodiment of an account record for use in a database for authentication in accordance with the system and method of the invention.

Referring to FIG. 10, account records may include information regarding a subscriber 16. That may include the name of an entity 16 corresponding to a computer system various contact information, from phone numbers and addresses to emails, skype phone numbers, Facebook or other social media contact addresses, and the like of particular importance may also be indexing corresponding certain information to other information.

For example, files, keywords, and the like may all be used in indexing to find media files 52 corresponding to subscribers 16, to venues or the like. In addition, account records may also include permissions, including codes, name lists, and the like. Account records may also include rules to be implemented by a server 16, a server 12, or a server 20 responsible to deliver content, interactions, information, codes, URL's 145, or the like to an administrator 68 or other responsible person corresponding to a subscriber 16. Likewise, information corresponding to executing scripts 150, information to be used, processed, or delivered thereby, and the like may all be included in account records. Whether an account is active, inactive, paid up, out of date, cancelled, in arrears, or the like may be reflected in status information provided thereby. Similarly, likewise, subscription information may also be included. This may include, for example, services being provided by the Liiingo™ server 12, the media servers 20, or the database 14.

For example, depending on size, choices made for business reasons, or need for such, subscription information may include certain rights, certain services, levels of service, and the like. Just as permissions may limit individuals having access or organizations having access to information, a subscription may include terms of service and what services are provide and thereby available to a subscriber 16, or patrons 18 accessing a subscriber 16.

Figure 11:
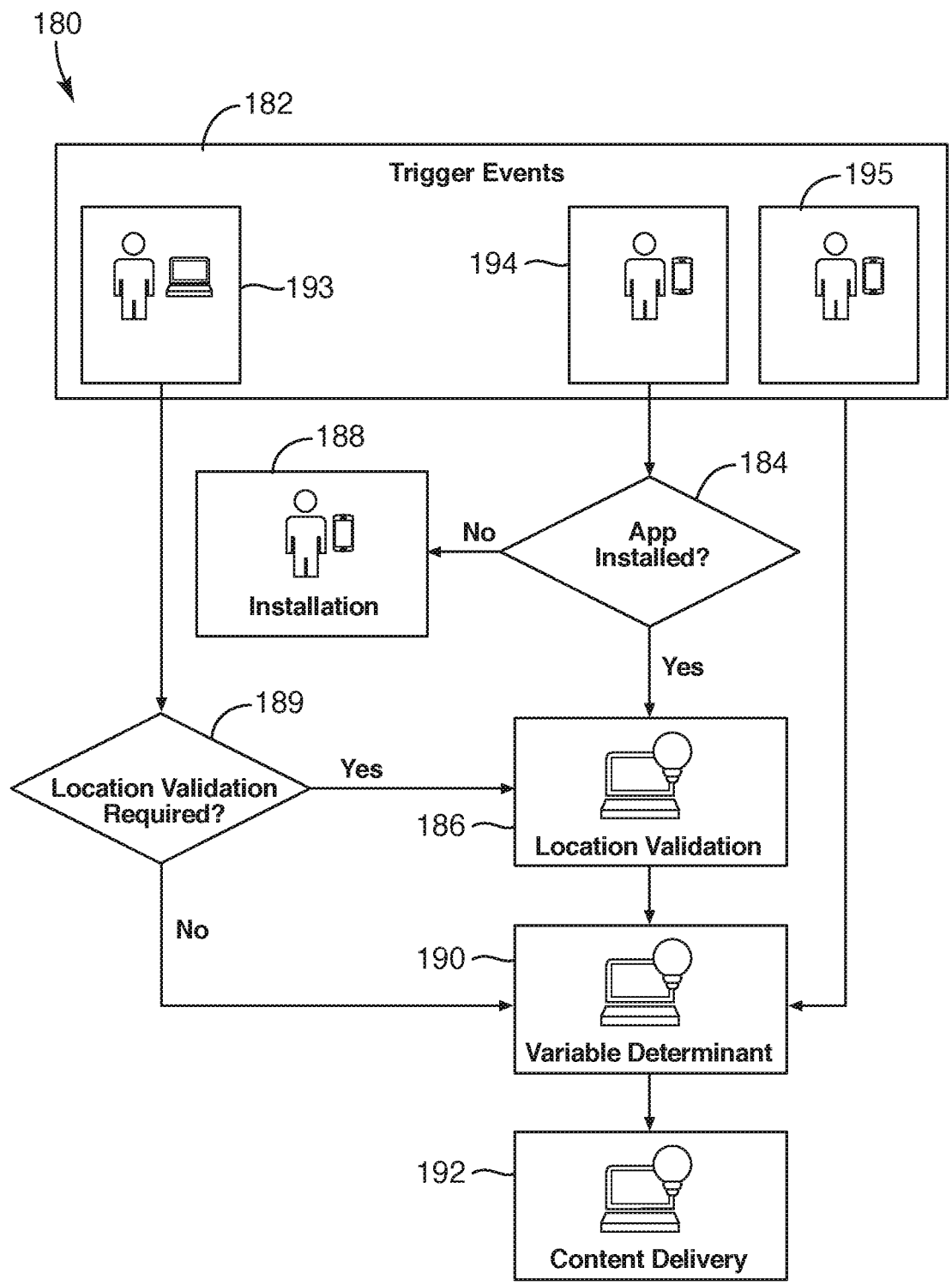
FIG. 11 is a schematic block diagram of a variable content delivery system in accordance with the invention.
Figure 12:
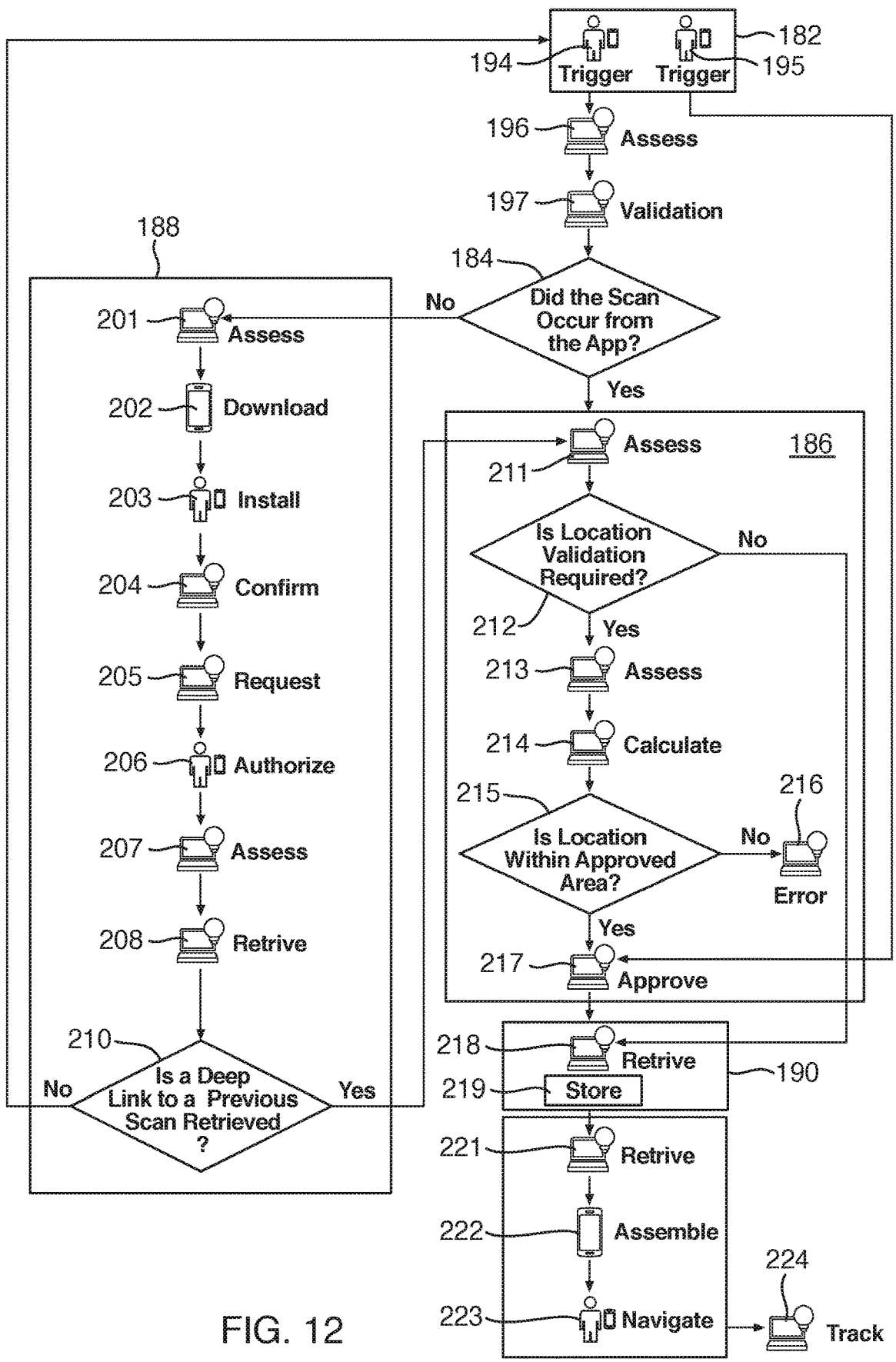
FIG. 12 is a schematic block diagram of an alternative embodiment of a variable content delivery system in which access may be through a mobile device.
Figure 13:
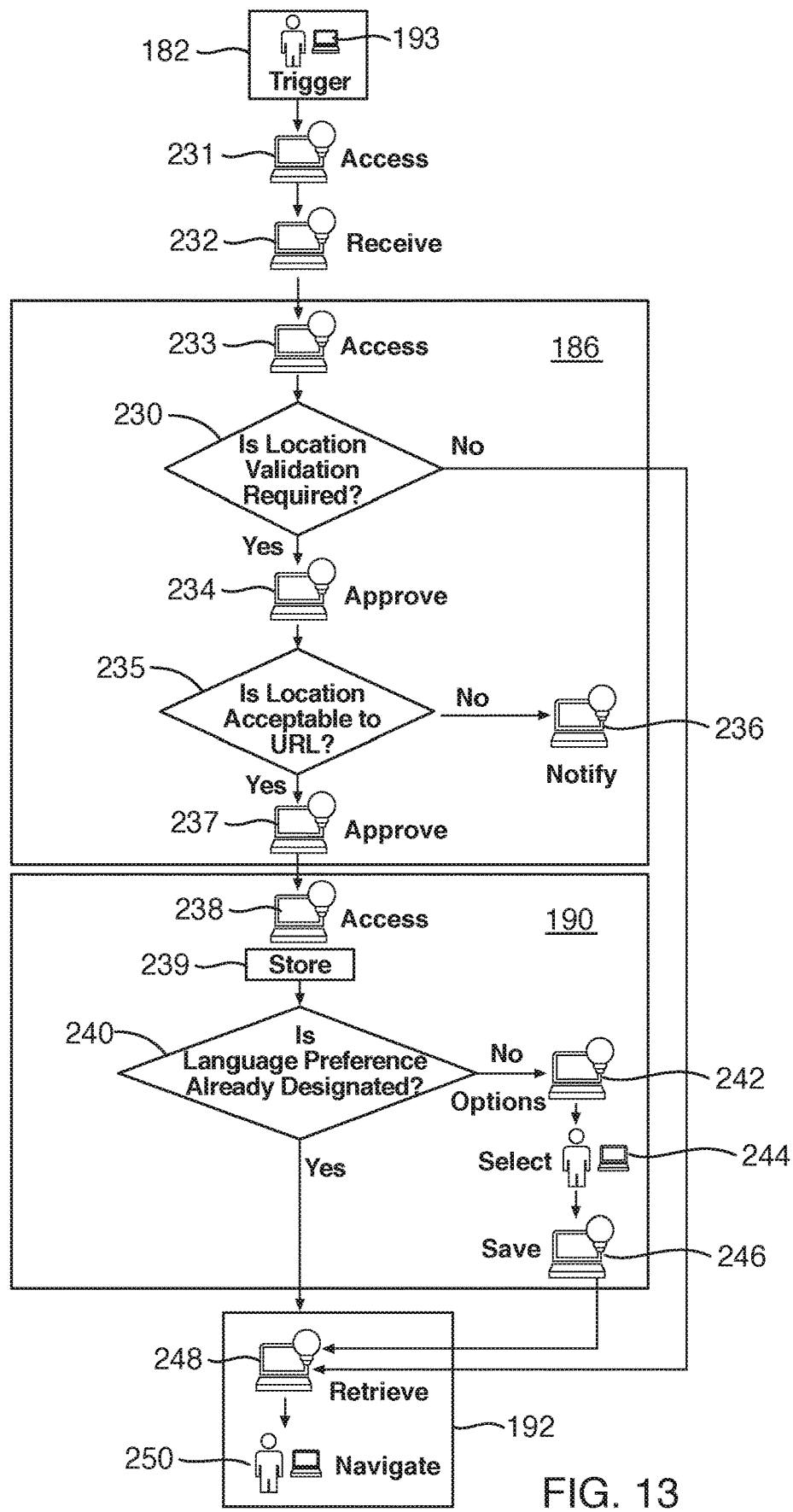
FIG. 13 is a schematic block diagram of a variable content delivery system in accordance with the invention wherein access may be made through a triggering event through a remote user or patron computer.

Referring to FIGS. 11 through 13, and more particularly FIG. 11, while continuing to refer generally to FIGS. 1 through 13, a process 180 is illustrated. The process 180 includes a triggering 182, which may occur by one of several modes. Thereafter, a test 184 determines whether or not an application has already been installed in the device 18 of a user 18. If not, then the process 180 directs the user 18 and user device 18 to an installation process 188.

If the application is determined to be installed when tested 184, then a validation 186 of the location of a user 18 occurs. As a practical matter, the installation process 188 effectively downloads an application and selects a language preference based on a user input or by detecting on a user device 18 a previous language use or language preference in the setup data for that device 18.

Also, if undetectable, or if a desired change is requested, a user 18 may be provided a dialogue box in which to select a language preference.

Meanwhile, a triggering 182 if resulted from an online viewer activating an alternate language option, such as by clicking or otherwise selecting a particular language preference, then the process 180 may proceed directly from the triggering 182 to a test 189. The test 189 is responsible to validate a location.

If the location is valid for the use of the content, then the test 189 may proceed directly to the validation 186 of the location. If, on the other hand, no location sensitivity has been programmed into the system 180, then the test 189 may simply divert directly to the determination 190 of the variables to be loaded. More detail will be included in subsequent figures and their descriptions. After determination 190 of the variables, the process 180 may proceed to delivery 192 of the content.

In the process 180, the triggering event 193 or the specific trigger 193 may result when an online viewer activates an alternative language option. On the other hand, an alternative triggering 194 may involve a viewer 18 (patron 18, user 18) who is positioned at some location, such as on the premises of a museum, theme park, zoo, or the like. At that location, a sign, display, label, kiosk, or the like may contain a code, such as a QR code or a barcode. This code may indicate something about that location, such as the exhibit.

Accordingly, this triggering 194 may occur on a first visit, such as where a patron 18 has arrived at a venue for the first time, and has not loaded any application. Thus, proceeding from the triggering 194 to the test 184 determines whether this new venue for a new patron 18 is completely without preparation, or may have already occurred subsequent to installing an application specific to that venue of the portable device of the user 18 or patron 18.

Another triggering 195 may occur when a user 18 (viewer 18, patron 18) possesses a portable device that is already loaded or has already installed an application corresponding to the venue. In such an event, the venue may contain beacons. Thus, a patron 18 or user 18 entering a beacon area may receive a radio frequency signal directly to the portable device, which then triggers 195, as a result the application operating, resulting in the process 180 proceeding directly to determining 190 the operational variables.

The test 184 is responsible to determine whether an application corresponding to a specific venue or usable at a specific venue, has already been installed on an otherwise unknown device that has previously triggered 194 based on scanning a location-specific code. To that end, if the test 184 results in a positive response, meaning that an application has already been installed, then the process 180 may move on to determine more information about the location of the user's 18 device.

For example, a display at a venue (museum room, museum exhibit, etc.; a zoo exhibit or animal enclosure, etc.) may be "fenced" by establishing a region within geographical boundaries identifiable by a global positioning system (GPS). A GPS in a modern smart device, such as a smartphone, may determine within a comparatively close accuracy (for example, about one to two meters) exactly where that device is located. Accordingly, a venue may effectively fence an area by identifying a boundary or outer corners, from which an analysis in the validation process 186 or validation step 186 may analyze whether or not the device is within the bounds of the GPS extreme core bounding points. This geometric calculation may be based on Cartesian geometry coordinates or the like in order to establish various regions of a venue.

Meanwhile, in a various map applications exist in the world, and many proprietary systems are available. For example, companies such as Google™ Apple™, MapQuest™, and others provide map applications that may be hosted on or accessed by user-owned, network-aware, computer devices, including mobile smartphones, tablets, iPods, and so forth. Accordingly, the validation may involve a calculation of the position by triangulation from GPS systems and then an analysis of where the location of the user device 18 is with respect to the extrema (bounding, defining, outermost points) for a particular exhibit at a particular venue.

In certain embodiments, a server 12 may receive location data indicating physical location of a user 18. In other examples, the server 12 may determine a URL or receive a URL as part of data contained in the code originating at the triggering 182, such as the triggering event 194. If fencing or location-sensitive controls are used, and if the GPS coordinates of the user device 18 are within the acceptable bounds, typically meaning within the boundaries of the venue proper, and within the bounds of a particular exhibit, either of which may be or both of which may be controlling parameters, then the location is deemed acceptable to proceed. If not, then a notification to a user device 18 and an end to the process 180 may occur.

Thus, if the location is acceptable, the determination step 190 may follow the validation step 186. In that regard, before moving on, it should be noted that the test 189 determines whether a location validation is required. In some cases, no location validation 186 is necessary, required, or useful. However, location within a venue may be tested 189 in order to verify proper ticketing and payment.

Likewise, proximity to or proximity within a viewing area of a particular exhibit at a venue may also be useful in determining what information will be delivered 192 a user 18. Thus, location information may be used for verifying authorization and ticketing, but may also serve as a tour guide stimulus to identify the proper presentation or the proper information to be delivered 192 as content from a user device 18.

Determining 190 the operational variables may involve the server 12 accessing various files or device settings on a user device 18. The typical, modern, smartphone and basically any computing device will have certain settings that are provided with values (numbers, decisions, preferences, choices, etc.) indicating how, where, when, and so forth certain information is presented to a user 18. These device settings may be available for reading out to the server 12. If available, they may indicate language choices set up on the smart device. They may thereby provide a transparent mechanism by which to determine a language preference or set up information for a user 18.

On the other hand, if they are unavailable or unclear, the server 12 may provide a dialogue box on the Applicant's device 18 in which the user is requested to select an available language or other option. For example, not only language, but detail, the educational or intellectual level of the viewer 18, or the like may be selected.

Also, for example, an adult with substantial information may choose an expert level of information to be presented by the content delivery 192. A child may more appropriately hear only a more basic and rudimentary explanation. Thus, just as the language materials may be prepared and presented as the content delivery 192, levels of detail and previous preparation may also be determined in the determination 190. Once these options have been selected, detected, or otherwise provided to the server 12, they may be stored to be accessed by the server 12 at any appropriate time before serving up any particular content to be delivered 192.

In certain embodiments, a server 12 may read settings on mobile device 18. Meanwhile, user profile may have a language preference. Likewise, certain subscriber controls for subscribers who have an application hosted on the mobile device may have languages available. Finally, a user 18 may simply make a selection based on presentation of options and pressing buttons to select one thereof. FIG. 4 also provides additional information on the determination of variables. Likewise, the validation process 186 is also fleshed out somewhat in FIG. 4. By the same token, the installation process 188 is further clarified in FIG. 6, and particularly in items 122 through 125.

Delivery 192 by the server 12 requires retrieval of the appropriate information based on the determination 190 of the operational variables, such as language, skill level or vocabulary level, and age level, or the like. The server 12 then serves 192 or delivers 192 the content associated with the specific identifier associated with the triggering event 182 that gave rise to the process 180. That identifier may be a URL. Accordingly, whether an alternative language option identifier, a code such as a QR core or other code, or a beacon identifier, may indicate content, while the determination 190 will decide the language determinant.

For example, FIG. 7 identifies additional rendering 147. FIG. 8 identifies the step 164 as well as the change 135 of views and the loading 136 in FIG. 6.

At any and all times, as authorized by a user 18, the server 12 may store and collect demographic data that is non identifying, or that is specifically identifying of a user 18. Thus, an individual user 18 may choose to be tracked, with languages, content, dates, times, and other client use data that will be useful in the future to the system 10 in serving that particular user device 18.

On the other hand, data may be collected strictly anonymously, in order to determine numbers, broad demographic patterns of use and access to a venue, and so forth. Thus, the venue may tailor its content, offerings, and the like according to how many patrons 18, of what characteristics, have used or desired to use certain content and services for exhibits.

Likewise, a subscriber 16 may select what languages will be available and how they will be ordered on a dialogue box or menu. Meanwhile, the subscriber 16 also determines the nature of the content delivered 192. This may include video content, audio content, text, images, labeling, notices, and so forth.

Meanwhile, a user 18 by preferences determined from demographics specific of an individual or by choices such as the determination 190 and so forth, exactly what information will be presented, and in what format. For example, a child may prefer an image and an audio presentation, an adult may prefer brief text as being a more readily and rapidly available.

Referring to FIG. 12, while continuing to refer generally to FIGS. 1 through 13, a trigger event 182 or a triggering 182 instigated by a patron 18 at a particular location. A patron 18 triggers 194 by scanning 194 a code, such as a QR code, barcode, other graphical code, or other numerical code. Upon the triggering 194 or the execution 194 of a triggering event 194, an assessment 196 evaluates the code.

For example, a user device 18 effectively deciphers the data content of the code, which will typically in a system 10 in accordance with the invention, include an identifier. That identifier may be a uniform resources locator (URL) associated with the code that was read. Next, a validation 197 is conducted by the server 12 which has been delivered the decipher information from the code by the reader device 18.

The information that may best and perhaps and most easily be used from that code is the URL embedded within the data presented by the code. Once the server 12 receives the identifier or URL, it conducts an analysis to determine whether the source of an API request was from its designated application on the user device 18.

If so, in a test 184 makes the determination and the presence of the App forwards the process 180 to the validation 186. If the App is not present, then the test 184 sends the device 18 or directs the device 18 to the installation step 188. If installation 201 is required, then the assessment step 201 includes the server 12 assessing the operating system of the user device 18 that has filed the API request or transmit the API request and the code (URL, identifier content, etc.) and redirects the device 18 to a location that will download the application.

This may be an "App store" such as exists in an online environment such as Amazon™ or Apple™. The server may download certain information from the device 18 in order to determine its operating system, and thereby determine appropriate App store would be. At this point, the server 12 may save other data associated with the scan. In this way, the server 12 may keep track of the user device 18 and cooperate with it appropriately.

Typically, an App store will download 202 to a device 18 an application requested. Accordingly, the application will be made available in the event that the application is already present, then the download 202 may simply devolve down to opening the application on the device 18 that made the request. Accordingly, installation 203 provides access by the user may then receive a confirmation 204 that the application has been installed.

Thereafter, an authorization request will come from the server 12 to the device 18 in order to request access by the server 12 to the device settings and the GPS location (information, GPS detection system, etc.) in order to permit the server 12 to obtain the necessary data. The authorization step 206 may include providing an option for the patron 18 or user 18 to select certain permissions or to grant all requests and permissions to the server 12 in order to make the installation and setup processes more transparent or to some extent more opaque and otherwise less burdensome or intrusive on the user 18.

Accordingly, the user 18 authorizes 206 the request 205 or an answer or response to the request 205 for authorization. The user 18 may select options in order to grant the necessary permissions.

Thereafter, the server 12 assesses 207 preferences and other information that may provide demographic information, personalized interface information, such as language, detail level, age or experience range, or the like in order to provide to the user 18 through the device 18 the language, literally, as well as the vocabulary and details at the level desired by the user 18.

The server 12 may default to a particular language corresponding to the GPS directions or location of the device 18. In this way, a user 18 need not select a language, but may use the local default. Meanwhile, a menu may be presented by the assessment step 207 in order to allow a user 18 to make a specific selection, input a selection, or approve a default selection. Of course, if no selection is made, then the default will be selected.

The retrieval 208 is responsible to retrieve a deep link corresponding to the user device 18. That deep link corresponds to the QR code, and may be used in the test 210 to determine whether a deep link to a previous scan has been retrieved. This may simplify the steps.

For example, if a deep link to a previous scan has been retrieved, then the test 210 may advance to the validation step 186 beginning with any validation assessment 211. Otherwise, if no deep link to a previous scan retrieved is identified, then the negative response to the test 210 returns to process 180 to the trigger event 182, and specifically to the triggering 194.

The test 210, if the deep link is retrieved may advance directly to the validation assessment 211. In this step 211, the server assess if a location validation is required in order to deliver content. Again, location may be important in determining exactly what the content is. It may also be used as an authorization filter in order to detect unauthorized access, or inappropriate access. As described hereinabove, an area may be fenced in order to assure authorization by payment, ticketing, or the like.

Meanwhile, the association of content with a particular exhibit at a venue may also be done "geographically" as the server assesses what the location validation requirements may be before delivering content to a device 18. Accordingly, the process 180 within the sub process 186 or step 186 they move to the test 212 determining whether a location validation is required. If not, then the step 186 is complete and the process 180 may simply step forward to the determination step 190 and the language preference retrieval 218.

On the other hand, if location validation is required, then the location assessment 213 may include the application loaded on the device 18 accessing the application programming interface (API) on the device 18, in order to access the GPS system and determine the physical location and coordinates for the device 18.

In certain circumstances, ongoing validation may be required for continued access to content. In addition, other options may be available such as cell tower triangulation, signal strength measurement, certain fixed internet protocol (IP) addresses, and the like. Those IP addresses may be permanent addresses associated with the venue, temporarily assigned addresses within a session opened by the device 18, or the like.

If the GPS system within the device 18 is inactive or otherwise not available, the application may display notifications to a user 18 that a GPS system is required in order to access content. At this point, the system 10 may provide a dialog box, menu, or the like in order for a user 18 to activate the GPS system within the device 18.

In the illustrated embodiment, the validation 214 may involve the server 12 assessing whether a device 18 is within an approved physical area. Physical area, as discussed herewithin may be based on a content delivery appropriateness, or a permission or payment due by a patron 18 at a venue. As a practical consideration, a venue may be a property having security, admission price, or other restriction on access to the venue itself. In such an event, enforcement of access controls may be implemented based on whether a patron 18 is within the physical confines of the venue. Accordingly, lacking proper security, payment, or the like, an individual who is not a patron 18 and is not onsite at the venue may be prohibited or prevented accessing electronically information that might otherwise be apparent on a WiFi system, or other broadcast mechanism.

Similarly, one benefit for a system and method in accordance with the invention is the ability to provide highly targeted locations within a venue and correspondent those highly targeted locations with information, audio, video, or the like on a user device 18 at the appropriate time at the specific targeted location. To that end, information may be limited as to the physical location from which it may be accessed. In either event, the validation 214 may be required. Thus, the server 12 determines whether the user device 18 is within the approved, appropriate, or other limitation of a physical area in order to obtain access to content.

The test 215 determines whether the location reported by the user device 18, and calculated by the validation 214. In other words, the step 214 may be considered a calculation 214 of the position of a user 18 within the bounds of a venue. It not, then the test 215 directs the process 186 to a notice 216 or error 216. That is, typically, a server 12 will not operate to deliver content if the test 215 reports a negative result. The server 12 determines that the device is not within the approved physical area, and therefore refuses to access content. Typically, they notification 216 or error 216 may beneficially include not just a shut down or lack of access, but some notification as to the nature of that refusal. Typically, the user device 18 will display a message for the user 18.

On the other hand, if the test 215 returns a positive result, then the approval 217 may be conducted by the server 12. The server 12 determines that the device 18 is within the approved physical area, and thus approves 217 the delivery of content. That approval 217 advances the process 180 to the step 190 determining 190 the language preference. In other words, the server 12 will retrieve 218 the language preference that has been obtained from pervious entry of that information by the user 18, or has been retrieved from the setting on the user device 18.

Accordingly, the server 12 will then store 219 that preference information associating with that user 18 in the database 14 or in a file elsewhere this language preference information.

Thereafter, the content may be delivered in a step 192 in which delivery 192 is accomplished by retrieving 221, by the server 12, the content associated by the specific trigger event 182 (e.g., 194, 195) that gave rise to the request. Again, the application may then assemble 222 and display the content identified by the server 12 and delivered to the device 18. Information proper for assembly 222 may be delivered to the device 18, or simply assembled by the server 12 and the display information forwarded or communicated to the user device 18. At this point, assembly of the related content may then be presented, and may include a menu for selection of particular portions thereof by a user 18.

Ultimately, the user 18 at the location appropriate to the information may then navigate 223. Navigation 223 may involve navigating the content, and also navigating two other locations at the display, or navigating away therefrom.

As a practical matter, tracking 224 by the server 12 may include tracking of triggering events 182, language preferences saved 219, viewer demographics, and the like. This information may be anonymous, indicating that it contains no identifying information corresponding to the user 18, or may, with permission from the user 18, contain user identifiable information in order to operate as a cookie or the like or to operate within a cookie in order to deliver more promptly and easily content previously useful to service of that user 18.

Referring to FIG. 13, a process 180 may be embodied slightly differently based on the triggering 182 originating from a different type of trigger event 193. For example, in the illustrated embodiment, the triggering 182 or triggering event 193 occurs when an online viewer activates an alternate language option or requests a different language. This may be done, for example, by clicking on an option, by typing in a word, by providing a code or designation such as an age, or the like. Thus, the triggering event 193 is effective to identify the need expressed by a user 18, viewer 18, patron 18, or the like at a menu in identifying any particular language needs.

Again, it should be noted that language or presentation format may involve a specific, recognized, national or ethnic language, or an age-appropriate or attention-span-appropriate choice of vocabulary, length, or details of information. This may affect delivered audio, video, text, and the like. Thus, one who speaks Chinese may indicate Chinese as a choice of language. A parent having a six year old child may set a preference for a six year old's vocabulary in English. Thus, the triggering event 193 may provide information by any reasonable code, indicator, or data that may useful in determining the specific presentation language.

In assessment 231 results when a user device 18 activates a uniform resource locator (URL) associated with an alternate language option. That is, as a result of the triggering 193 in step 182, the result of identifying a designated language is to effectively redirect the user device 18 to a URL at which the content in the appropriate language will be found.

Thus, the server 12 next receives 232 the session variables for this session. Among that information is the URL associated with the alternate language option as well as an identifier or ID corresponding to that alternate language option.

Initially, a validation process 186 may assess 233 whether a validation of the patron 18 location is a prerequisite required before delivery of content. This requirement may be associated with a geographical boundary, such as the perimeter of a venue (e.g., museum, theme park, zoo, outdoor museum, etc.). If a user 18 has not paid an entry fee required to enter the venue, and is thus nearby (within electronic transmission range) but not within the boundary, then authorization may be required. Those outside the boundary would be denied as causing a location error. Similarly, geographical location information may also be used to determine whether a patron 18 is within an appropriate proximity to an exhibit, display, animal enclosure, or the like. In this case, the importance of location relates to delivery of the proper content corresponding to the location. In either circumstance, or both, location information may be required by the system 12 in order to server proper content and determine authorization.

Thus, a test 230 is responsible to determine whether a flag, filter, data field, or the like is required to be set or provided a value before proceeding. Thus, if location information is not required, then the process 186 may jump directly to the delivery 192, and may even go directly to the retrieval step 248 therein. Otherwise, location validation being required, the process 186 moves to the assessment 234.

This information is then subjected to a validation 234 by the server 12, which determines whether the URL from which the alternate language option was activated is an acceptable location. Again, this step 186 containing the validation 234 may not be required, but typically is due to the nature of the triggering event 193. Thus, a test 235 determines whether the location from which the trigger event 193 proceeded is within a suitable geographic region. If not, then a notification occurs in forming a patron 18 or patron device 18 that the access has failed. Typically, the notification 236 will also indicate a reason, including the fact that the geographic location is no longer valid. This means that the user device 18 is either not in the proper location, or the user 18 may not be in the proper location due to ticketing and other issues as described hereinabove.

Meanwhile, if the test 235 determines that a URL is acceptable with a location, then an approval 237 is returned by the server 12. At this point, the process 180 may determine the variables to be used in a variable determinant sequence 190, or a variable determination 190. As in other alternative embodiments, based on various locations, conditions, relations, and the like associated with triggering 182 the process 180, the variable determination 190 may begin with assessing 238 by the server 12 whether the language preference corresponding to the viewer patron 18, and so forth has already been stored. That is, if the patron 18 or some other indicator in the profile of the patron 18, or in the database 14 assessed by the server 12 is clear, then the preference may already be stored. Otherwise, this preference will need to be set up. Accordingly, the preference information may be stored as a session variable, a profile setting, or in some other associated local database or file register. By either mode, this preference is once identified, may then be stored 239 or linked 239 with the user patron 18.

If the test 240 determines that no language preference has presently been saved, designated, or otherwise known, then the options step 242 is responsible to assess available language options, based on the type of trigger event 182, in this case the trigger 193. Typically, this step is conducted by the server 12, based on the particular languages or language choices in which the desired content has been prepared, made available, and stored. Accordingly, selection 244, by a patron 18 may be performed by selecting 244 from a menu, icon, or other choice presented. A patron 18 may type in a language preference to a dialogue box in certain embodiments. For example, menus may often be limited in size for convenience. Thus, more common choices available may be presented directly for selection by clicking or otherwise activating a button. Meanwhile, other options may be made available by designating another button or typing in an alternative language but may or may not be found subsequently available. The selection, is transmitted back to the server 12 which will then operate on that information to comply. It may also save 246 that information.

Meanwhile, the step 190 may also include saving 246 session information. Such information may include the language preference for future use in connection with the designated patron 18. Such information may be saved 246 in an appropriate location, such as an associated database, a file linked to the session or the user 18, a field in a spreadsheet, or register elsewhere on the server 12 or the user device 18. Information may be saved 246 in multiple locations.

At this point, the process 180 is prepared for delivery 192 of content. Accordingly, the server 12 may retrieve 241 and present by suitable mechanism, such as a display, audio player, text display, images, video, or the like the content associated with the trigger event 193 specifically selected and triggered 182 by the user 18. This content will be at the URL selected in corresponding to that content, and corresponding to the determination 190 of language.

Ultimately, the online viewer 18 may now navigate 250 upon receiving such as by viewing or interacting with the content. Content may include audio, video graphic, webpage, links, optical interactions, menus, purchase options, social media, and the like. The user 18 may thus navigate 250 the information or content presented. For example, a user 18 may select options, jump to particular presentations, skip uninteresting or unnecessary presentations, or even navigate out to an alternative triggering event 182. Thus, navigation 250 may include both navigating the information presented, as well as navigating the screen options in order to navigate the process 180 again, or initiate it again with a new triggering event 193, 194, 195.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

Wherefore, we claim:

1. A method of mutual authorization comprising:
   exchanging with a patron device pre-authorization for subsequent communication of proprietary information to be triggered by an event associated with the patron device in the future;
   receiving a request for requested content from the patron device, the request containing a first identifier received by the patron device from the event associated with the patron device;
   maintaining a linking of the requested content to the first identifier and to a second identifier associated with a location of the requested content in data storage;
   authenticating the patron device to receive at least a portion of the requested content; and
   responsive to authenticating the patron device:
      retrieving media content from the data storage to which the patron device has permission, the media content associated with the requested content;

tailoring the media content according to patron information associated with the patron device; and delivering the tailored media content to the patron device.

2. The method of claim 1, wherein the event associated with the patron device corresponds to the patron device scanning a bar code or QR code.

3. The method of claim 2, wherein the first identifier includes information encoded in the bar code or the QR code.

4. The method of claim 1, wherein the event associated with the patron device corresponds to the patron device being within established geographical boundaries.

5. The method of claim 1, wherein the event associated with the patron device corresponds to the patron device receiving a transmitted signal from an object at a venue.

6. The method of claim 1 further comprising accessing the data storage subject to permissions associated with the patron device to retrieve the patron information.

7. The method of claim 1 further comprising delivering probable content desired in addition to the media content, the probable content desired based at least in part on the patron information.

8. The method of claim 1, wherein the media content includes content in a computer language.

9. The method of claim 1, wherein authenticating the patron device includes checking a token received from the patron device.

10. The method of claim 9, wherein the token is generated using information contained in the first identifier.

11. The method of claim 1 further comprising generating a content identifier associated with the first identifier, the content identifier configured to control information included in the tailored media content delivered to the patron device.

12. The method of claim 1, wherein the data storage is hosted on a remote server.

13. A server in a mutual authorization system that includes a patron device and remote data storage, the server comprising:

a network interface configured to communicate with the patron device and the remote data storage over internetwork links;

a memory configured to store executable data structures; and a processor configured to execute the executable data structures that are configured to cause the server to:

exchange with the patron device pre-authorization for subsequent communication of proprietary information to be triggered by an event associated with the patron device in the future;

receive a request for requested content from the patron device, the request containing a first identifier received by the patron device from the event associated with the patron device;

maintain a linking of the requested content to the first identifier and to a second identifier associated with a location of the requested content in the remote data storage;

authenticate the patron device to receive at least a portion of the requested content; and responsive to authenticating the patron device:

retrieve media content from the remote data storage to which the patron device has permission, the media content associated with the requested content;

tailor the media content according to patron information associated with the patron device; and deliver the tailored media content to the patron device.

14. The server of claim 13, wherein the remote data storage is hosted on a remote server.

15. The server of claim 13, wherein the event associated with the patron device corresponds to the patron device scanning a bar code or QR code.

16. The server of claim 13, wherein the event associated with the patron device corresponds to the patron device being within established geographical boundaries.

17. The server of claim 13, wherein the processor is further configured to access the data storage subject to permissions associated with the patron device to retrieve the patron information.

18. The server of claim 13, wherein the processor is further configured to deliver probable content desired in addition to the media content, the probable content desired based at least in part on the patron information.

19. The server of claim 13, wherein authenticating the patron device includes checking a token received from the patron device.

20. The server of claim 13, wherein the processor is further configured to generate a content identifier associated with the first identifier, the content identifier configured to control information included in the tailored media content delivered to the patron device.

* * * * *